United States Patent
Doumar et al.

(10) Patent No.: US 12,462,270 B2
(45) Date of Patent: *Nov. 4, 2025

(54) SYSTEM AND METHODS FOR SOFT CREDIT APPROVAL USING TEXT REDIRECT

(71) Applicant: TapText llc, Coral Springs, FL (US)

(72) Inventors: Steve Doumar, Fort Lauderdale, FL (US); David Teodosio, Guilford, CT (US)

(73) Assignee: TAPTEXT LLC, Coral Springs, FL (US)

( * ) Notice: Subject to any disclaimer, the term of this patent is extended or adjusted under 35 U.S.C. 154(b) by 321 days.

This patent is subject to a terminal disclaimer.

(21) Appl. No.: 18/177,590

(22) Filed: Mar. 2, 2023

(65) Prior Publication Data
US 2023/0281653 A1 Sep. 7, 2023

Related U.S. Application Data

(63) Continuation-in-part of application No. 18/161,086, filed on Jan. 29, 2023, which is a continuation-in-part
(Continued)

(51) Int. Cl.
*H04M 1/64* (2006.01)
*G06F 16/955* (2019.01)
(Continued)

(52) U.S. Cl.
CPC ..... *G06Q 30/0207* (2013.01); *G06F 16/9554* (2019.01); *G06F 16/9558* (2019.01);
(Continued)

(58) Field of Classification Search
CPC ...... G06Q 40/03; G06Q 40/25; G06Q 20/322; G06Q 30/016; G06Q 30/0207;
(Continued)

(56) References Cited

U.S. PATENT DOCUMENTS 7,571,138 B2 8/2009 Miri et al.
8,131,635 B2 3/2012 Gagnon et al.
(Continued)

FOREIGN PATENT DOCUMENTS

EP 3316549 A1 5/2018

OTHER PUBLICATIONS

Wang et al. Non-fungible token (NFT): Overview, evaluation, opportunities and challenges. arXiv preprint arXiv:2105.07447.Oct. 25, 2021. [retrieved on Jul. 3, 2023] Retrieved from the Internet < URL: https://arxiv.org/pdf/2105.07447.pdf> entire document.

*Primary Examiner* — Md S Elahee
(74) *Attorney, Agent, or Firm* — Galvin Patent Law LLC; Brian R Galvin

(57) ABSTRACT

A system and method for soft credit approval using text redirect. The first step is engagement by a user computing device, such as a mobile phone, with a call-to-action element that may be embedded in various media including a QR code or NFC-enabled beacon and that triggers a text message to auto-populate on the user computing device. The auto-populated message comprises a unique identifier and consumer financial information. The second step is for the user to tap to send the auto-populated message to a credit analysis manager, which evaluates the consumer financial information according to the lender's lending criteria and instructions. Optionally, the system may integrate with a universal identification and passport manager, send pre-qualified credit offers to the consumer, and send an automatically completed credit application to the lender upon consumer approval.

20 Claims, 26 Drawing Sheets

Related U.S. Application Data of application No. 17/942,227, filed on Sep. 12, 2022, now Pat. No. 12,158,938, and a continuation-in-part of application No. 17/943,118, filed on Sep. 12, 2022, now Pat. No. 12,067,587, which is a continuation-in-part of application No. 17/875,402, filed on Jul. 27, 2022, now Pat. No. 11,861,640, and a continuation-in-part of application No. 17/409,841, filed on Aug. 24, 2021, now Pat. No. 11,610,193, which is a continuation-in-part of application No. 17/360,731, filed on Jun. 28, 2021, now Pat. No. 11,871,308, said application No. 17/943,118 is a continuation-in-part of application No. 17/351,321, filed on Jun. 18, 2021, now Pat. No. 11,201,965, which is a continuation of application No. 17/349,659, filed on Jun. 16, 2021, now Pat. No. 11,488,188, said application No. 17/875,402 is a continuation of application No. 17/349,659, filed on Jun. 16, 2021, now Pat. No. 11,488,188, which is a continuation of application No. 17/348,660, filed on Jun. 15, 2021, now Pat. No. 11,232,471, which is a continuation of application No. 17/344,695, filed on Jun. 10, 2021, now Pat. No. 11,354,691, which is a continuation of application No. 17/229,251, filed on Apr. 13, 2021, now abandoned, said application No. 17/360,731 is a continuation-in-part of application No. 17/229,251, filed on Apr. 13, 2021, now abandoned, which is a continuation-in-part of application No. 17/209,474, filed on Mar. 23, 2021, now Pat. No. 11,599,916, which is a continuation-in-part of application No. 17/208,059, filed on Mar. 22, 2021, now Pat. No. 11,562,407, which is a continuation-in-part of application No. 17/191,977, filed on Mar. 4, 2021, now abandoned, which is a continuation-in-part of application No. 17/190,260, filed on Mar. 2, 2021, now Pat. No. 11,532,020, which is a continuation-in-part of application No. 17/153,426, filed on Jan. 20, 2021, now abandoned, said application No. 17/360,731 is a continuation-in-part of application No. 17/085,931, filed on Oct. 30, 2020, now Pat. No. 11,055,736, which is a continuation-in-part of application No. 16/693,275, filed on Nov. 23, 2019, now Pat. No. 11,270,354.

(60) Provisional application No. 63/411,837, filed on Sep. 30, 2022, provisional application No. 63/411,163, filed on Sep. 29, 2022, provisional application No. 63/350,415, filed on Jun. 9, 2022, provisional application No. 63/319,314, filed on Mar. 12, 2022, provisional application No. 63/211,496, filed on Jun. 16, 2021, provisional application No. 63/166,391, filed on Mar. 26, 2021, provisional application No. 63/154,357, filed on Feb. 26, 2021, provisional application No. 63/040,610, filed on Jun. 18, 2020, provisional application No. 63/025,287, filed on May 15, 2020, provisional application No. 63/022,190, filed on May 8, 2020, provisional application No. 62/994,219, filed on Mar. 24, 2020, provisional application No. 62/965,626, filed on Jan. 24, 2020, provisional application No. 62/963,568, filed on Jan. 21, 2020, provisional application No. 62/963,379, filed on Jan. 20, 2020, provisional application No. 62/963,368, filed on Jan. 20, 2020, provisional application No. 62/940,607, filed on Nov. 26, 2019, provisional application No. 62/904,568, filed on Sep. 23, 2019, provisional application No. 62/883,360, filed on Aug. 6, 2019, provisional application No. 62/879,862, filed on Jul. 29, 2019.

(51) Int. Cl.
| | |
|---|---|
| *G06F 21/32* | (2013.01) |
| *G06F 21/62* | (2013.01) |
| *G06K 7/14* | (2006.01) |
| *G06K 19/06* | (2006.01) |
| *G06N 20/00* | (2019.01) |
| *G06Q 10/0631* | (2023.01) |
| *G06Q 30/016* | (2023.01) |
| *G06Q 30/0201* | (2023.01) |
| *G06Q 30/0207* | (2023.01) |
| *H04M 3/523* | (2006.01) |
| *H04M 3/527* | (2006.01) |
| *H04M 3/533* | (2006.01) |
| *G06Q 30/0251* | (2023.01) |

(52) U.S. Cl.
CPC .......... *G06F 21/32* (2013.01); *G06F 21/6245* (2013.01); *G06K 7/1417* (2013.01); *G06K 19/06037* (2013.01); *G06N 20/00* (2019.01); *G06Q 10/06315* (2013.01); *G06Q 30/016* (2013.01); *G06Q 30/0201* (2013.01); *H04M 3/523* (2013.01); *H04M 3/527* (2013.01); *H04M 3/53308* (2013.01); *H04M 3/53333* (2013.01); *G06F 2221/2139* (2013.01); *G06Q 30/0267* (2013.01)

(58) Field of Classification Search
CPC .............. G06Q 40/02; G06Q 30/0201; G06Q 10/06315; G06Q 30/0267; H04M 3/523; H04M 51/04; H04M 3/527; H04M 3/53308; H04M 3/53333; G06K 19/06037; G06K 7/1417; G06F 21/6245; G06F 21/32; G06F 16/9554; G06F 16/9558; G06F 2221/2139
USPC ...................................................... 379/88.22
See application file for complete search history.

(56) References Cited

U.S. PATENT DOCUMENTS

| | | | |
|---|---|---|---|
| 8,620,365 | B2 | 12/2013 | Hunziker |
| 8,783,571 | B2 | 7/2014 | Sakahashi et al. |
| 8,950,685 | B1 | 2/2015 | Lin et al. |
| 9,223,885 | B2 | 12/2015 | Marsico |
| 9,237,424 | B2 | 1/2016 | Nelkenbaum |
| 10,361,870 | B2 | 7/2019 | Chow et al. |
| 10,645,037 | B2 | 5/2020 | Schmid et al. |
| 11,062,038 | B2 | 7/2021 | Murphy et al. |
| 11,201,737 | B1 | 12/2021 | Will et al. |
| 11,205,105 | B1 | 12/2021 | Devlin et al. |
| 11,210,648 | B2 | 12/2021 | Ortiz et al. |
| 11,368,454 | B2 | 6/2022 | Whaley et al. |
| 2012/0226743 | A1 | 9/2012 | Smargon |
| 2012/0278142 | A1 | 11/2012 | Li |
| 2012/0290478 | A1* | 11/2012 | Crofts ................. G06Q 20/322 |
| | | | 705/44 |
| 2013/0080316 | A1 | 3/2013 | Pawlusiak et al. |
| 2013/0144738 | A1 | 6/2013 | Qawami et al. |
| 2015/0039409 | A1 | 2/2015 | Marsico et al. |
| 2017/0214522 | A1 | 7/2017 | Code et al. |
| 2017/0244555 | A1 | 8/2017 | Beiter et al. |
| 2018/0060914 | A1 | 3/2018 | Conrad et al. |
| 2018/0322571 | A1* | 11/2018 | Vea ........................ G06Q 40/03 |
| 2019/0124021 | A1* | 4/2019 | DeMattei ............... G06Q 30/02 |
| 2019/0354665 | A1 | 11/2019 | Haslam et al. |
| 2020/0045020 | A1 | 2/2020 | Soundararajan et al. |
| 2020/0184085 | A1 | 6/2020 | Korten et al. |
| 2020/0186338 | A1 | 6/2020 | Andon et al. |

(56) References Cited

U.S. PATENT DOCUMENTS

| | | |
|---|---|---|
| 2020/0242105 A1 | 7/2020 | Rich et al. |
| 2021/0092135 A1 | 3/2021 | Strogov et al. |
| 2021/0256070 A1 | 8/2021 | Tran et al. |
| 2021/0306460 A1 | 9/2021 | Doumar et al. |
| 2021/0319116 A1 | 10/2021 | Jarvis |
| 2021/0398095 A1 | 12/2021 | Mallett et al. |
| 2022/0201476 A1 | 6/2022 | Naujok et al. |
| 2022/0201477 A1 | 6/2022 | Rolfe |

* cited by examiner

SYSTEM AND METHODS FOR SOFT CREDIT APPROVAL USING TEXT REDIRECT

CROSS-REFERENCE TO RELATED APPLICATIONS

Priority is claimed in the application data sheet to the following patents or patent applications, each of which is expressly incorporated herein by reference in its entirety:
Ser. No. 18/161,086
63/411,163
Ser. No. 17/942,227
63/319,314
Ser. No. 17/943,118
Ser. No. 17/875,402
Ser. No. 17/349,659
Ser. No. 17/348,660
Ser. No. 17/344,695
Ser. No. 17/229,251
63/166,391
Ser. No. 17/209,474
Ser. No. 17/208,059
Ser. No. 17/191,977
Ser. No. 17/190,260
Ser. No. 17/153,426
62/965,626
62/963,368
62/963,379
63/040,610
63/025,287
63/022,190
62/994,219
63/154,357
63/350,415
Ser. No. 17/409,841
Ser. No. 17/360,731
Ser. No. 17/229,251
Ser. No. 17/085,931
63/040,610
63/025,287
63/022,190
62/994,219
62/965,626
62/963,568
62/963,368
62/963,379
62/940,607
Ser. No. 16/693,275
62/904,568
62/883,360
62/879,862
63/211,496
Ser. No. 17/351,321
Ser. No. 17/349,659

BACKGROUND OF THE INVENTION

Field of the Art

The disclosure relates to the field of computer-based communication systems, and more particularly to user identification and pre-approval processes.

Discussion of the State of the Art

Pre-qualification is used as an initial step to give consumers an idea of how much credit they could be approved for and at what rates. However, pre-qualification introduces numerous problems, including exhaustion of consumer goodwill, reputational harm to lenders, inaccurate submissions, wasted resources, and identity theft.

Lenders may opt to send unsolicited pre-qualified offers of credit to consumers who might fit a lending profile based on unverified available information. Consumers bombarded with physical and digital offers may become increasingly annoyed. If the consumer is unfamiliar with the lender, an unsolicited offer may also be treated with skepticism or generate distrust. Lenders relying on outdated or incorrect information may appear incompetent or unreliable. Further, consumers may not be receptive to an offer based on the stated terms or timing of the offer. Simultaneously, pre-qualifications based on consumer-submitted data may end up being rejected by the lender due to information conflicts discovered during verification prior to final approval. When a pre-qualification fails verification after a hard credit inquiry, the consumer's credit score may be lowered by as much as 10 points.

Soliciting and vetting consumers is costly. Obtaining and assembling credit-related information, identifying potentially interested consumers, preparing and offering pre-qualified credit products, paying for printing and postage or online marketing campaigns, verifying consumer identity and creditworthiness, and manually reviewing conflicted applications lead to wasted resources and increased lending costs. Small businesses and even larger financial institutions may be deterred from offering credit to consumers because of these costs.

Additionally, consumers are increasingly concerned about the risk of identity theft. Lenders may be tempted to mail pre-approved applications to verified consumers to decrease costs, but these applications elevate consumer's risk exposure. Identity thieves can profit by stealing mail, using pre-approved applications to open credit accounts under the consumer's name, and changing the consumer's mailing address to their address or PO box.

What is needed is a system and method for timely integrating soft credit approval with consumer verification.

SUMMARY OF THE INVENTION

Accordingly, the inventor has conceived, and reduced to practice, a system and method for soft credit approval using text redirect. The first step is engagement by a user computing device, such as a mobile phone, with a call-to-action element that may be embedded in various media including a QR code or NFC-enabled beacon and that triggers a text message to auto-populate on the user computing device. The auto-populated message comprises a unique identifier and consumer financial information. The second step is for the user to tap to send the auto-populated message to a credit analysis manager, which evaluates the consumer financial information according to the lender's lending criteria and instructions. Optionally, the system may integrate with a universal identification and passport manager, send pre-qualified credit offers to the consumer, and send an automatically completed credit application to the lender upon consumer approval.

According to a preferred embodiment, a system for soft credit approval using text redirect, comprising: one or more computing devices comprising a memory, a processor, and a non-volatile data storage device; a first database stored on the non-volatile data storage device, comprising a plurality of lender instructions, each lender instruction of the plurality of lender instructions comprising a scheme for generating placement of call-to-action elements and an approval procedure for qualifying a consumer for receiving credit; a positioning manager comprising a first plurality of programming instructions stored in the memory which, when operating on the processor, causes the one or more computing devices to: retrieve a lender instruction from the first database; generate a call-to-action element comprising coding instructions configured to generate a pre-filled short message service (SMS) or multi-media message service (MMS) message comprising a destination, an identifier, and consumer financial information, such that interaction with the call-to-action element on the user computing device causes the user computing device to propagate the pre-filled SMS or MMS message; place the call-to-action element according to the scheme specified in the lender instruction; save the identifier to the lender instruction in the database; a consumer credit manager comprising a second plurality of programming instructions stored in the memory which, when operating on the processor, causes the one or more computing devices to: receive the SMS or MMS message from the user computing device via the destination; retrieve from the first database a lender instruction using the identifier; analyze, using the consumer financial information and the approval procedure, the consumer's qualification for receiving credit; send a notification to the lender; and send a second notification to the consumer, is disclosed.

According to another preferred embodiment, a method for soft credit approval using text redirect, comprising the steps of: creating a first database on a non-volatile data storage device of one or more computing devices, the one or more computing devices comprising a memory, a processor, and the non-volatile data storage device, the database comprising a plurality of lender instructions, each lender instruction of the plurality of lender instructions comprising a scheme for generating placement of call-to-action elements and an approval procedure for qualifying a consumer for receiving credit; using a positioning manager operating on the one or more computing devices to perform the steps of: retrieving a lender instruction from the first database; generating a call-to-action element comprising coding instructions configured to generate a pre-filled short message service (SMS) or multi-media message service (MMS) message comprising a destination, an identifier, and consumer financial information, such that interaction with the call-to-action element on the user computing device causes the user computing device to propagate the pre-filled SMS or MMS message; placing the call-to-action element according to the scheme specified in the lender instruction; saving the identifier to the lender instruction in the database; using a consumer credit manager operating on the one or more computing devices to perform the steps of: receiving the SMS or MMS message from the user computing device via the destination; retrieving from the first database a lender instruction using the identifier; analyzing, using the consumer financial information and the approval procedure, the consumer's qualification for receiving credit; sending a notification to the lender; and sending a second notification to the consumer, is disclosed.

BRIEF DESCRIPTION OF THE DRAWING FIGURES

The accompanying drawings illustrate several aspects and, together with the description, serve to explain the principles of the disclosed embodiments. It will be appreciated by one skilled in the art that the particular arrangements illustrated in the drawings are merely exemplary, and are not to be considered as limiting of the scope of the claims herein in any way.

DETAILED DESCRIPTION OF THE DRAWING FIGURES

Figure 1:
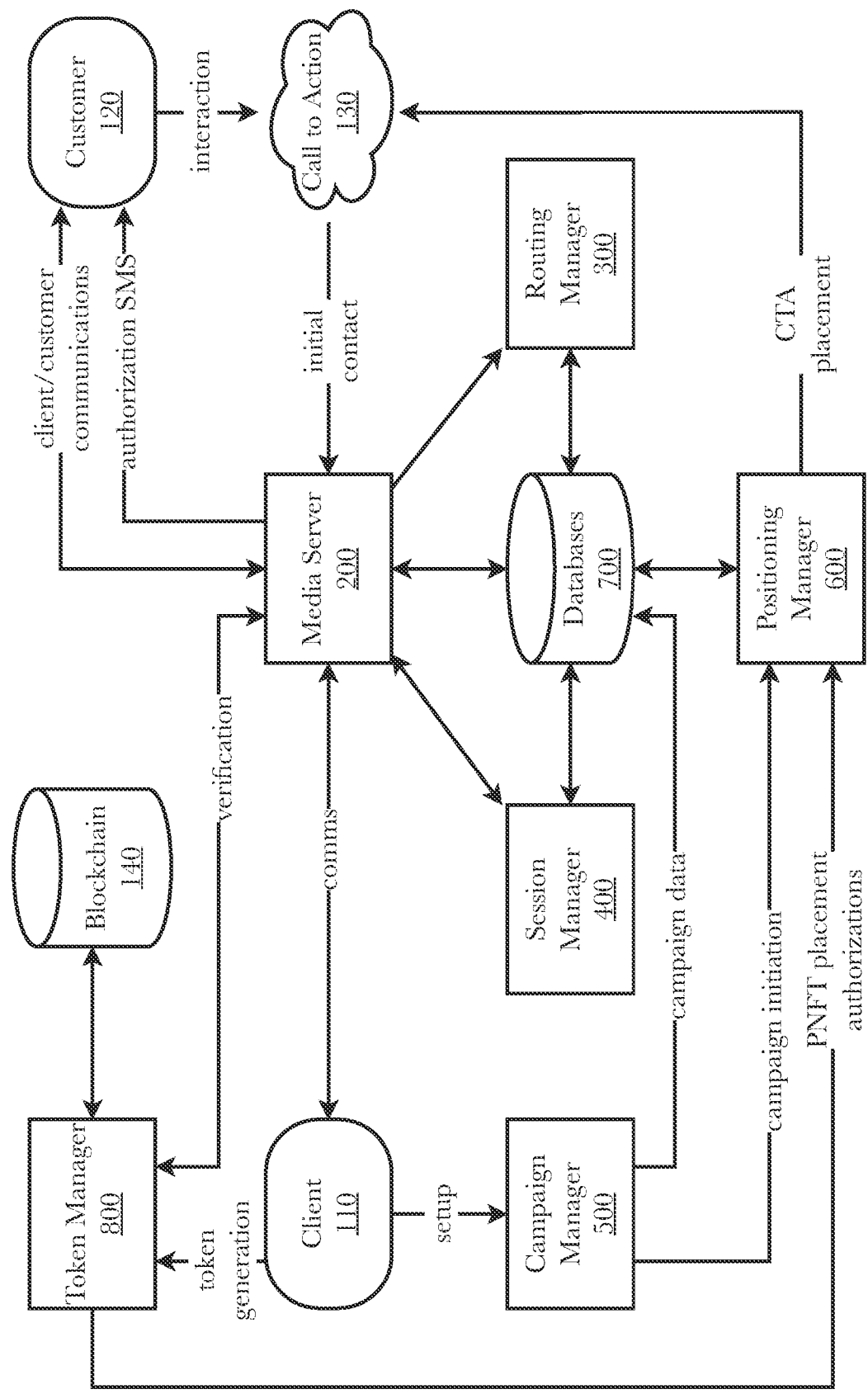
FIG. 1 is an exemplary system architecture for a communications and interaction system using SMS-based authorizations and personal non-fungible tokens.

The inventor has conceived and reduced to practiced, a system and method for soft credit approval using text redirect. The first step is engagement by a user computing device, such as a mobile phone, with a call-to-action element that may be embedded in various media including a QR code or NFC-enabled beacon and that triggers a text message to auto-populate on the user computing device. The auto-populated message comprises a unique identifier and consumer financial information. The second step is for the user to tap to send the auto-populated message to a credit analysis manager, which evaluates the consumer financial information according to the lender's lending criteria and instructions. Optionally, the system may integrate with a universal identification and passport manager, send pre-qualified credit offers to the consumer, and send an automatically completed credit application to the lender upon consumer approval.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in said arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is an exemplary system architecture for a communications and interaction system using SMS-based authorizations and personal non-fungible tokens. In this exemplary embodiment, the system comprises a media server 200, a routing manager 300, a session manager 400, a campaign manager 500, a positioning manager 600, databases 700, and a token manager 800. The system facilitates communications and interactions between clients 110 and customers 120 using calls to action 130. A client 110 is any person or entity (e.g., a business entity) wishing to engage in communications or interactions and who has established a marketing campaign or established a personal non-fungible token (PNFT) for that purpose. A customer 120 is any person or entity (e.g., a business entity) wishing to engage in communications or interactions with a client 110. Communications and interactions between clients 110 and customers 120 are initiated by a customer's interaction with a call to action (CTA) 130. The CTA 130 is any means for contacting a client 110 through the system comprising a way to identify the CTA 130 and the client with which it is associated. For online and other digital CTAs (websites, emails, in-app advertisements, etc.), the CTA 130 will generally be generated and placed by the system in accordance with a client's 110 marketing campaign rules or PNFT rules. However, non-electronic CTAs are also possible such as printed CTAs in print advertising, signage, or in-store displays.

The media server 200 acts as the communication channel interface between client and customer devices, passing various forms of communications media (emails, texts, traditional telephone, VOIP, etc.) between the devices. The routing manager 300 selects an appropriate routing for incoming and outgoing communications based on information from the session manager. The session manager 400 creates and manages each communication session between a client and customer by creating a session initiation protocol (SIP) communication sessions for each communication between a client and customer using the CTA identifier, the customer's contact information, and information about the communications medium being used. The session manager 400 monitors and logs the session and terminates the session when the communication ends. The campaign manager 500 provides the client with an interface through which the client may create automated advertising campaigns which may be dynamically adjusted based on feedback from customer interactions with CTAs and other information. The positioning manager 600 creates campaign instances from a campaign, and automatically determines where and when to place CTAs for each campaign instance depending on scheduling, targeting, and budgeting goals. The databases 700 store campaign information, client information, and customer information. The token manager 800 interfaces with a blockchain 140 and provides an interface for design and generation of PNFTs, establishment of automation rules for interactions with PNFTS, and verification of identities using PNFTs.

Figure 2:
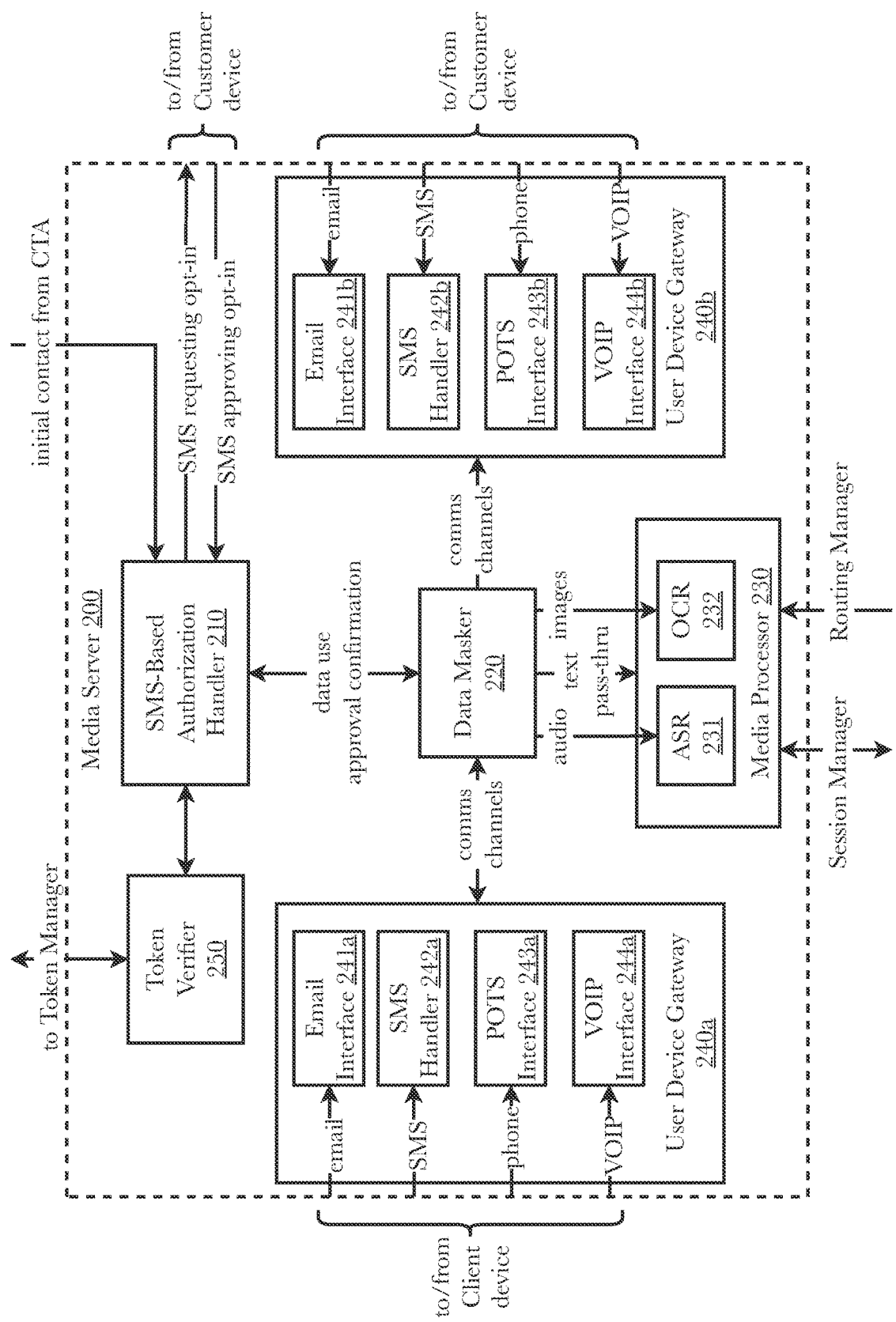
FIG. 2 is an exemplary media server aspect of a communications and interaction system using SMS-based authorizations and personal non-fungible tokens.

FIG. 2 is an exemplary media server aspect of a communications and interaction system using SMS-based authorizations and personal non-fungible tokens. The media server 200 acts as the communication channel interface between client and customer devices, passing various forms of communications media (emails, texts, traditional telephone, VOIP, etc.) between the devices. In this embodiment, the media server comprises an SMS-based authorization handler 210, a data masker 220, a media processor 230, user device gateways 240*a,b*, on both the client and customer sides, and a token verifier 250.

In this embodiment, an SMS-based authorization handler 210 is shown as part of the media server 200. The SMS-based authorization handler 210 handles the data use authorization (also called an "opt-in") process via text messages. Using the SMS-based authorization handler 210, the system is configured to facilitate interactions by utilizing a short message service (SMS) authorization methodology wherein interaction with a CTA on a smartphone initiates a series of SMS messages back and forth to the media server 200 which authorizes communications between the user of a smartphone (a customer) and a third party associated with the CTA (a client). When the customer interacts with the CTA on his or her smartphone, the CTA accesses the smartphone's text messaging application and causes the smartphone to generate a first SMS on the smartphone which has been pre-filled with an SMS address code for the SMS-based authorization handler 210 of the media server 200 and a CTA identifier. When the first SMS is sent from the smartphone, the SMS-based authorization handler 210 of the media server 200 receives the first SMS, captures the CTA identifier and phone number of the smartphone, and sends a second SMS back to the smartphone containing a link and a request for authorization to send the phone number to a third party for communications (e.g., "To authorize Company X to call you back on phone number Y to purchase product Z, click here."). Clicking on the link in the second SMS sends a third SMS back to the SMS-based authorization handler 210 of the media server 200 authorizing the transmission of the phone number to a client so that the client may contact the customer. In this way, authorization for capture of the customer's phone number and establishment of communications with a client can be established simply by having the customer click on two automatically-generated SMS messages without having to otherwise enter any data on the smartphone. This method works universally on all smartphones with SMS technology without having to install additional applications. The data use approval confirmation received by the customer is logged and passed to other components of the system (e.g., to the session manager via the data masker) to confirm authorization to use private information. Note that while SMS technology is the primary example used herein, the invention is not so limited and other forms of mobile device interactions may be used, provided that an identifier for the mobile device can be obtained from the interaction (e.g., multi-media message service (MMS) messages, email addresses from email headers, caller ID from phone calls, caller ID from VOIP calls, etc.).

A data masker 220 operating on the media server 200 preserves the privacy of both client and customer by masking the phone number, email addresses, and other identifying information of the parties until they voluntarily exchange confidential information between themselves via the communications medium. As the data masker 220 is privy to the private information of the parties, it can establish a connection with each party separately using the private information, and they join the parties together via a real-time communications medium (e.g., phone) without having to pass the private information to each of the parties or can forward non-real-time communications between the parties (e.g., emails) while stripping identifying information from the transmitted messages (e.g., from the email headers).

The media processor 230 converts audio and image communications media to text, and passes through text communications to the session manager 400. For example, where the interaction with the CTA is in audio form (e.g., a call to a phone number printed on the CTA), the audio from the interaction may be sent to an automated speech recognition (ASR) processor 231 (also known as a speech-to-text (STT) processor) to convert the speech from the audio into text. Where the interaction with the CTA is a transmitted image (e.g., a photo of the CTA sent by MMS), the image from the interaction may be sent to an optical character recognition (OCR) processor 232 to extract any text in the image (e.g., the CTA identifier). The converted text is then sent to the NLP engine to be processed as with the interactions in text form. Any text interactions with the CTA (e.g., text messages), are passed through to the session manager 400.

User device gateways 240*a*, 240*b* on both the client side and customer side both comprise a plurality of interfaces 241*a*-244*a*, 241B-244*b* receive and transmit communications to and from client and customer devices. For simplicity and clarity, a single user device gateway is shown on the client end 240*a* and on the customer end 240*b*, each comprising an email interface 241*a,b*, a short message service (SMS) handler 242*a,b*, a plain old telephone (POTS, or traditional telephone line) interface 243*a,b*, and a voice-over-Internet-protocol (VOIP) interface 244*a,b*. While these are the most common media interfaces, the user device gateways 240*a,b* may have other such communications media interfaces and there may be a plurality of user device gateways 240*a,b* on either side.

Figure 3:
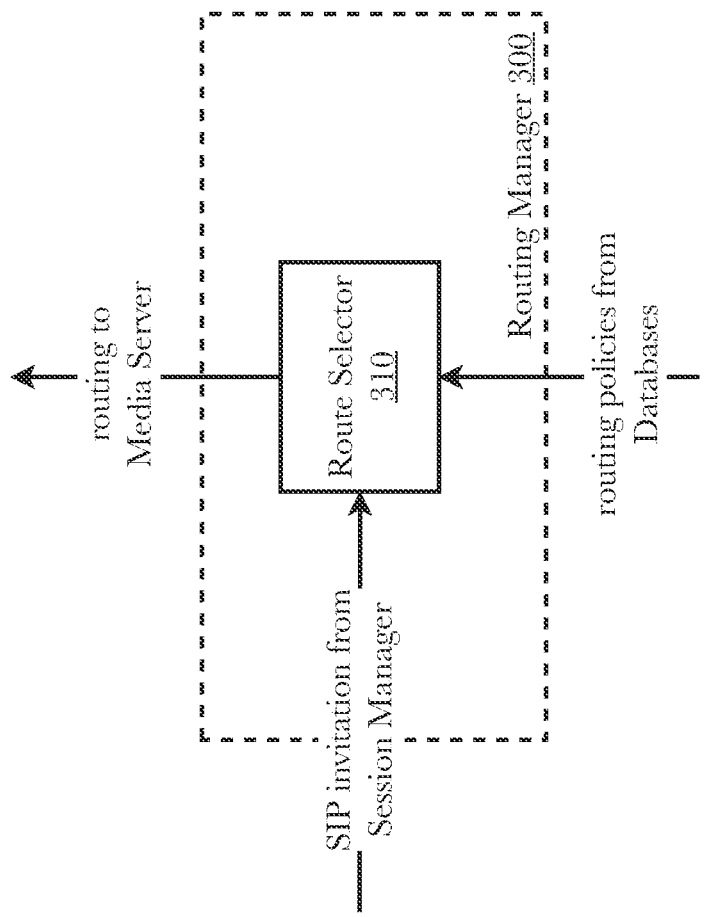
FIG. 3 is an exemplary routing manager aspect of a communications and interaction system using SMS-based authorizations and personal non-fungible tokens.

FIG. 3 is an exemplary routing manager aspect of a communications and interaction system using SMS-based authorizations and personal non-fungible tokens. In this embodiment, the media server 200 sends connection information to the session manager 400. Where a customer has interacted with a CTA, the connection information initially comprises a communications medium (e.g., mobile phone service), the customer's contact information for that communications medium (e.g., a phone number), and an identifier for the CTA (e.g., a CTA identification number or string). The session manager initiates a session initiation protocol (SIP) session by issuing an SIP invitation to the routing manager 300. The routing manager 300 receives the SIP invitation, retrieves one or more routing policies from the databases 700 using a route selector 310, determines an appropriate routing for the communication (e.g., to salesperson X at company Y who handles sales of the type of product advertised by the identified CTA), and sends the routing information to the media server 200, which proceeds to establish the connection.

The routing manager 300 selects an appropriate routing for incoming and outgoing communications based on information from the session manager. In this embodiment, the media server 200 sends connection information to the session manager 400. Where a customer has interacted with a CTA, the connection information initially comprises a communications medium (e.g., mobile phone service), the customer's contact information for that communications medium (e.g., a phone number), and an identifier for the CTA (e.g., a CTA identification number or string). The session manager initiates a session initiation protocol (SIP) session by issuing an SIP invitation to the routing manager 300. The routing manager 300 receives the SIP invitation, retrieves one or more routing policies from the databases 700 using a route selector 310, determines an appropriate routing for the communication (e.g., to salesperson X at company Y who handles sales of the type of product advertised by the identified CTA), and sends the routing information to the media server 200, which proceeds to establish the connection.

Figure 4:
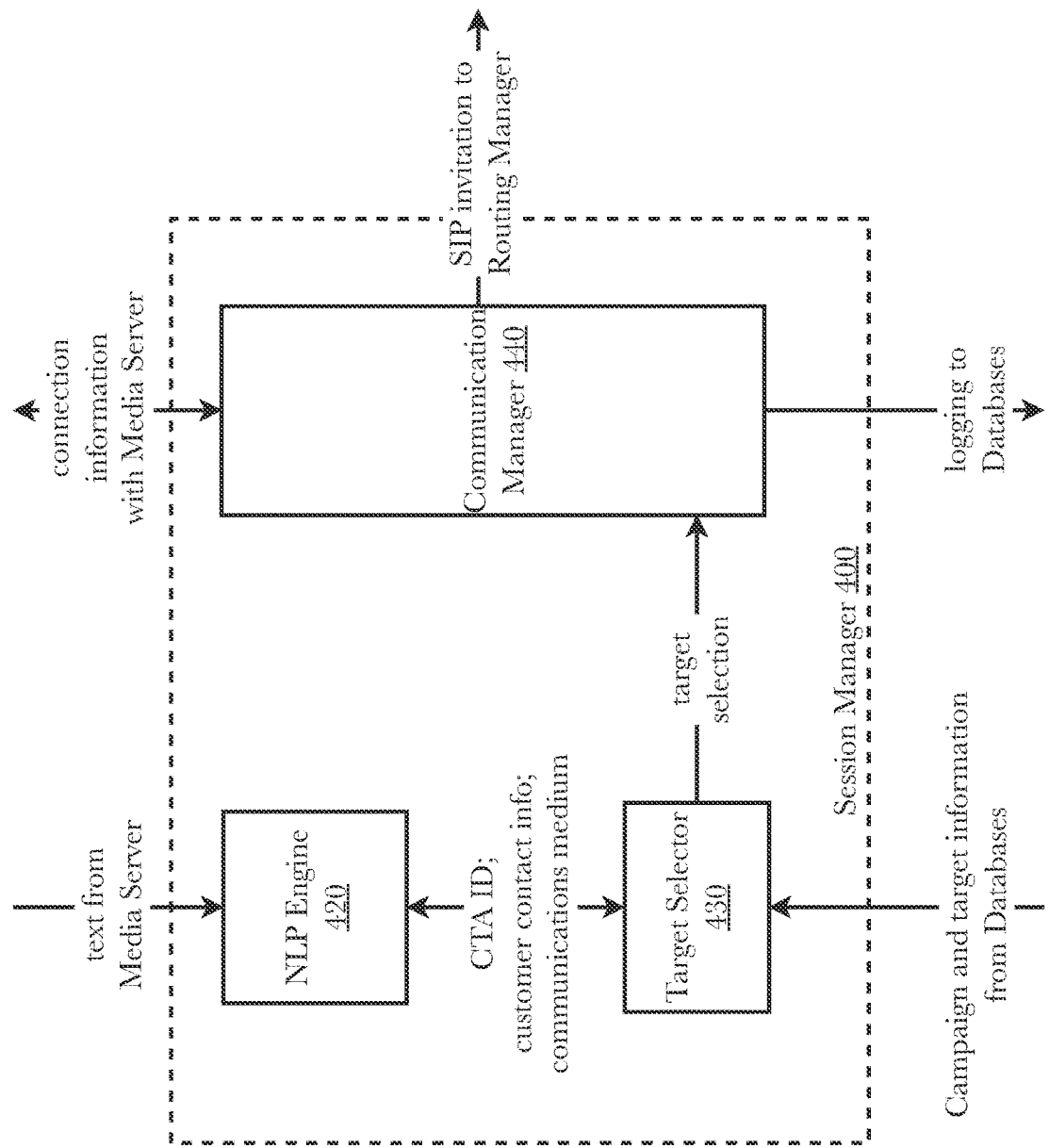
FIG. 4 is an exemplary session manager aspect of a communications and interaction system using SMS-based authorizations and personal non-fungible tokens.

FIG. 4 is an exemplary session manager aspect of a communications and interaction system using SMS-based authorizations and personal non-fungible tokens. The session manager 400 creates and manages each communication session between a client and customer. The session manager 400 creates session initiation protocol (SIP) communication sessions for each communication between a client and customer using the CTA identifier, the customer's contact information, and information about the communications medium being used. The session manager 400 monitors and logs the session, and terminates the session when the communication ends. In this embodiment, the session manager comprises a natural language processing (NLP) engine 420, a target selector 430, and a communication manager 440.

Where a customer has interacted with a CTA, an identifier for the CTA is obtained from one of a variety of methods (e.g., an identifier embedded in a link, a call to certain phone numbers designated to handle CTAs of a certain type, a CTA identifier in a text message from the customer, etc.). In this embodiment, where the interaction with the CTA is in text form (e.g., clicking on a website link CTA generates a pre-populated SMS containing the CTA identifier on the customer's mobile device which is sent to the media server), the text from the interaction with the CTA is sent to a natural language processing engine 420 which parses the text to extract the CTA ID, and possible other contextual information (such as the terms "lease" or "buy," which may determine to which department a lead is sent), along with the customer contact information (in this example, the phone number of the customer's mobile device from which the SMS was sent) and the communications medium (in this case, a return phone call to the phone number of the customer in response to the SMS).

Thus, the connection information initially comprises a communications medium (e.g., mobile phone service), the customer's contact information for that communications medium (e.g., a phone number), and an identifier for the CTA (e.g., a CTA identification number or string). Using the CTA identifier, the campaign and target information associated with the CTA identifier are retrieved from a campaign database for the relevant client, and a target selector 430 selects an appropriate client target to receive the communication depending on the connection information (e.g., a salesperson X in department Y at company Z who specializes in the type of product advertised by the CTA). After the target is selected, a communications manager 440 of the session manager 400 initiates a session initiation protocol (SIP) session by issuing an SIP invitation to the routing manager 300. After creation of the session, the communication manager 440 monitors and logs the session, and terminates the session when the communication ends.

Should the initially-selected target not be available, the target selector 430 may initiate a routing script that queries the databases 700 to determine next target resource. This process may be repeated until all potential targets of the client in the campaign are exhausted (i.e. no client resource is available to accept the call for that CTA). In that event, the voice call may be routed to a voicemail system corresponding to one of the client's resources or a general voicemail box. A notification of the failed attempt to connect with a live client resource may be sent to the client.

Figure 5:
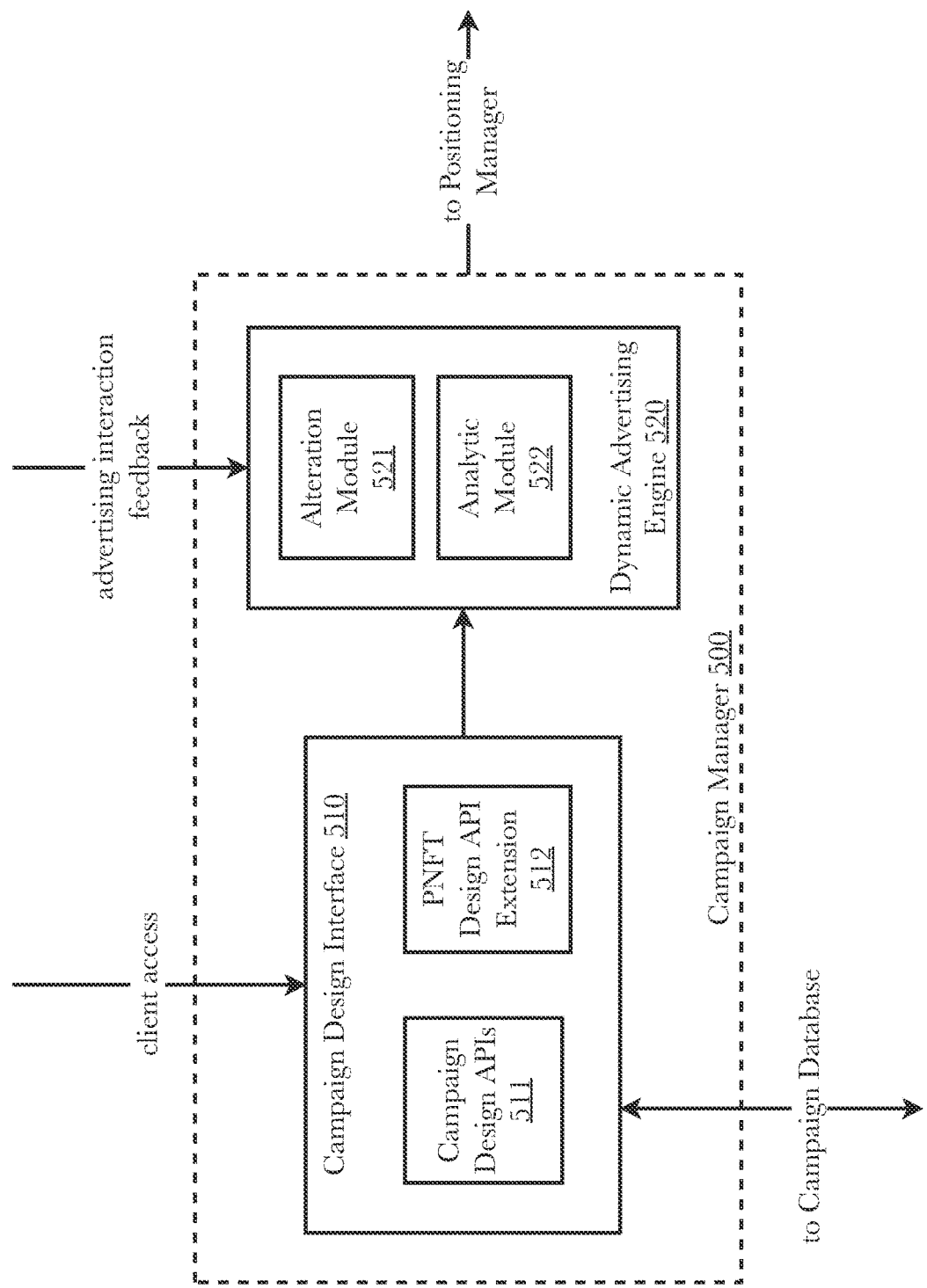
FIG. 5 is an exemplary campaign manager aspect of a communications and interaction system using SMS-based authorizations and personal non-fungible tokens.

FIG. 5 is an exemplary campaign manager aspect of a communications and interaction system using SMS-based authorizations and personal non-fungible tokens. The campaign manager 500 provides the client with an interface through which the client may create automated advertising campaigns which may be dynamically adjusted based on feedback from customer interactions with CTAs and other information. In this embodiment, the campaign manager comprises a campaign design interface 510 and a dynamic advertising engine 520.

The campaign design interface 510 comprises one or more campaign design APIs 511 which allow clients to set up campaigns comprising products and services, target audiences, rules, schedules, budgets, and the like. Each campaign design API 511 provides one or more aspects of the interface such as a graphical interface, rule creation tools, budgeting tools, target audience selection tools, etc., and the collection of the campaign design APIs 511 allows the client to define complete marketing campaigns, which are stored in the campaign database of the databases 700. If PNFTs are used, the PNFT design API extension 512 allows access to a similar PNFT design interface in the token manager 800 for creation and implementation of PNFTs.

Once a marketing campaign is created and implemented, the dynamic advertising engine 520 can be configured to make automatic changes to the campaign (or an aspect of a campaign) based on feedback from interaction with CTAs and other information such as product or service sales numbers. In some embodiments, ad variants may be generated by dynamic advertisement engine 520. In some embodiments, ad variants may be generated semi-autonomously with input from business personnel. For example, dynamic advertisement engine 520 may receive data associated with an ad campaign and analyze it, and based on the analytic data it may suggest an element of an advertisement to be altered, which can then be reviewed and implemented by a client representative such as a business marketing manager. In some embodiments, ad variants may be generated autonomously. For example, dynamic advertisement engine 520 may receive analytic data associated with an ad campaign and based on the received data it may suggest an element of an advertisement to be altered, which can be automatically applied to the ad via the ad campaign data stored in campaign database 730.

A purpose of utilizing ad variants is to gather useful data about the efficacy, efficiency, and profitability of a given advertisement and/or an ad campaign. Implementing two similar ads with the only difference between the two being a single element alteration (i.e., A/B testing) can allow businesses to understand how elemental choices for an advertisement affect customer interaction. For example, an ad campaign for a hiking boot may be developed with the tagline "Reach New Heights With These Boots," and a variant ad may be developed the tagline "Tough On The Mountain, Gentle On Your Feet," wherein the only difference between both ads is the tagline. Both the baseline ad and the variant ad can then be deployed and customer engagement data with both the baseline and variant can be monitored and analyzed to determine which of the baseline or the variant led to better outcomes for the business running the ads and/or ad campaign. In some embodiments, ad campaign data may include a test plan for configuring the deployment of two variant advertisements. For example, a test plan may describe what element is to be tested and subsequently altered, the goals of the test plan (e.g., improving conversion rates), initial state of advertisement (i.e., baseline metric that describes current state of advertisement), the order of element alterations to be made, test design (e.g., how long to test the variants, which devices to test on, etc.) and the like. In some embodiments, test plans may be received, retrieved, or otherwise obtained from campaign database 730 by dynamic advertisement engine 520 as an input into suggesting element alterations.

According to some embodiments, the analytic module 522 may receive, retrieve, or otherwise obtain a plurality of data such as, but not limited to, details of interactions with CTAs, media stream data, ad campaign data, survey data, and business data, and may process the plurality of data in order to determine the efficacy of a given advertisement and/or ad campaign. In some embodiments, analytic module 522 may receive data pertaining to at least two advertisements comprising a baseline advertisement and a variant advertisement, and determine which of the two advertisements produced better results based upon analysis of the received data.

According to some embodiments, analytical data such as, for example, a determination of a better advertisement between at least two advertisements, may be received, retrieved, or otherwise obtained by dynamic advertisement engine 520. Dynamic advertisement engine 520 and/or alteration module 521 may process the analytical data together with ad campaign data (e.g., test plan information) in order to suggest at least one advertisement element to alter in order to form a new variant of an advertisement. For example, data analytics suggest that a first variant of a baseline advertisement was better at leading to product sales than the baseline version of the advertisement, and responsive to this analysis alteration module 521 can suggest an element alteration to the first variant to form a second variant. The first and second advertisement variants may then be deployed to various platforms via position manager 600 and the process of collecting data related to advertisement engagement/interaction can begin again using the first and second variant, wherein after statistically relevant data is collected, analytic module 522 may make a determination of whether the first variant or the second variant was better. The determination of a "better" advertisement can be based on statistically significant metrics such as, for example, ad clicks and conversion rates. In the case that the differences between two advertisements are statistically insignificant, dynamic advertisement engine 520 may suggest no alterations to an element. In some embodiments, the element to be altered is the same type of element (e.g., the tagline is altered between two advertisements).

In some embodiments, dynamic advertisement engine 520 may receive, retrieve, or otherwise obtain third party data to be used as an input when making element alteration suggestions. Because marketing is such a vital component of any business within any industry, there is a lot of market research data available regarding advertisement content and configuration which may be used by dynamic advertisement engine 520 to determine appropriate and effective element alterations. For example, studies have shown that an advertisement with a red call-to-action button outperforms a green call-to-action button by about 21%. The large difference in click rate between such a minor change shows the importance of testing different variants of a given advertisement in order to maximize customer engagement and improve conversion rates.

Figure 6:
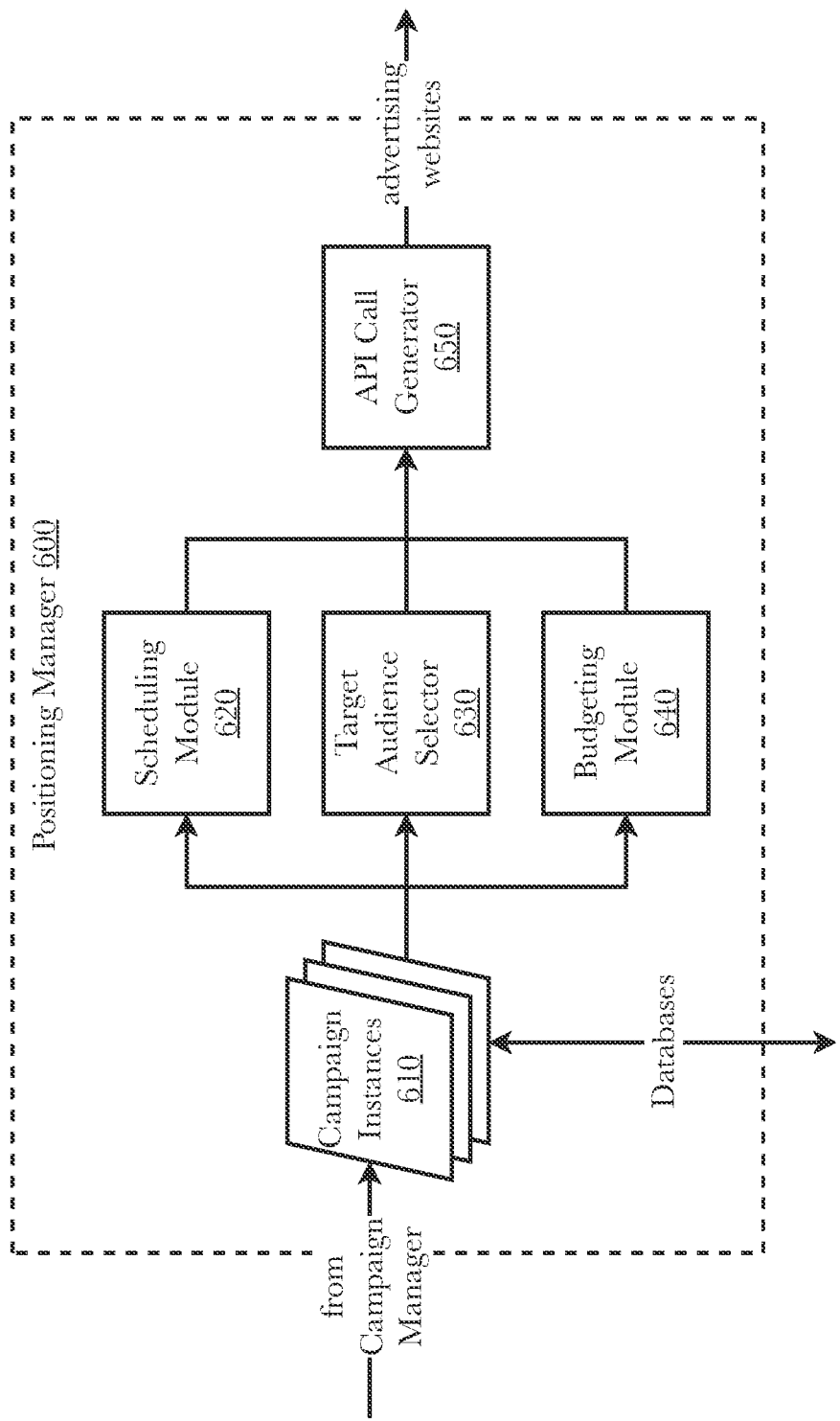
FIG. 6 is an exemplary positioning manager aspect of a communications and interaction system using SMS-based authorizations and personal non-fungible tokens.

FIG. 6 is an exemplary positioning manager aspect of a communications and interaction system using SMS-based authorizations and personal non-fungible tokens. In this embodiment, the positioning manager 600 creates campaign instances from a campaign, and automatically determines where and when to place CTAs for each campaign instance depending on scheduling, targeting, and budgeting goals.

The positioning manager 600 receives notification of the initiation of a campaign from the campaign manager, retrieves relevant information about the campaign from the databases 700, and creates one or more campaign instances 610 for implementation of the campaign. Not all campaigns will have multiple instances. Depending on the campaign configuration, each campaign instance will represent some portion or division of the campaign for implementation. For example, in a campaign by a dealership for automobile sales, instances may be generated for different types of cars which will be marketed to different target audiences. Campaign instances 610 will typically have rules associated scheduling, target audiences, and budgets. In this embodiment, each instance will is analyzed by a scheduling module 620 to identify scheduling rules and constraints and output an advertisement schedule, a target audience selector 630 to identify relevant target audiences and output a target audience selection, and a budgeting module 640 to track budgeting expenditures for the instance and output a remaining budget amount for advertising of the instance. The outputs of the scheduling module 620, target audience selector 630, and a budgeting module 640 are send to an API call generator 650, which generates an appropriate API call to a third party advertiser in accordance with the third party advertiser's ad placement API (as one example, the Google Ads API has more than 200 parameters that can be set to determine where and when an ad should be placed on its platform).

Figure 7:
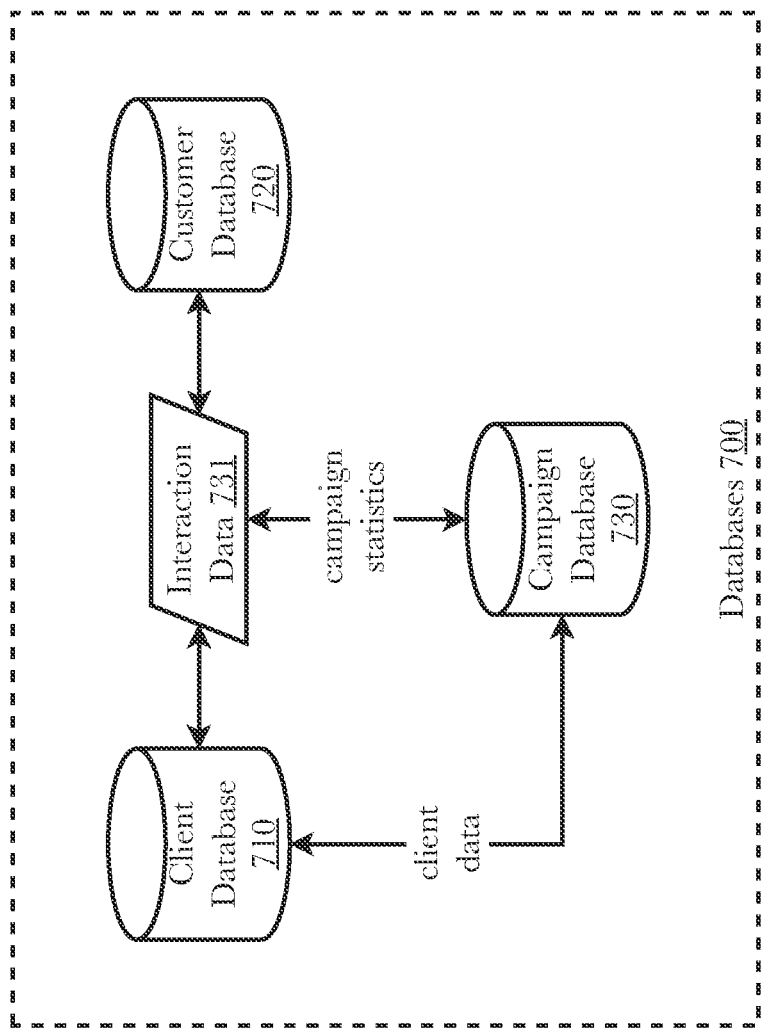
FIG. 7 is an exemplary set of databases for a communications and interaction system using SMS-based authorizations and personal non-fungible tokens.

FIG. 7 is an exemplary set of databases for a communications and interaction system using SMS-based authorizations and personal non-fungible tokens. The databases 700 store campaign information, client information, and customer information.

The client database 710 comprises information about the client for facilitating communications between clients and customers such as client contact information; target information for the client such as subsidiaries, office locations, departments, units, agents, sales representatives, and employees; logs of interactions with customers; records of the products, services, and campaigns associated with certain customers; and lists of campaigns associated with the client.

The customer database 720 comprises information about the client for facilitating communications between clients and customers such as customer contact information, logs of CTAs with which the customer has interacted, records of the products, services, and campaigns associated with CTAs with which the customer has interacted, customer purchase history, customer preferred contact method (e.g. mobile phone, e-mail), customer preferred contact times, and customer previous interaction history.

The campaign database 730 may take the form of a managed or unmanaged database, document-oriented database system, or SQL database, or other suitable form of database. Examples of types of database software that may operate include MYSQL™, ORACLE DATABASE™, MONGODB™, and others. The campaign database 730 may exist as a distinct physical device or be operating on another computing device that may perform other functions aside from operating, hosting and serving the campaign database 730. If the campaign database 730 is a distinct physical device, the database may be connected over a LAN or WAN, the Internet, a direct physical connection to another device, or some other network connection. The campaign database 730 may be a centralized database system. The campaign database 730 may be a distributed database system.

The campaign database 730 may be configured to store a plurality of ad campaigns including the associated ad campaign data for each ad campaign in the ad campaign database 730. In some embodiments, the ad campaign data specifies the different media platforms that will be used to broadcast the ad campaign. In some embodiments, ad campaign data may include one or more variants of an advertisement. In some embodiments, an advertisement variant may be an advertisement where at least one element of the advertisement has been altered in some form. Non-limiting examples of advertisement elements include: headlines and copywriting; call to actions (CTAs); images, audio, and video; subject lines (e.g., email ads); content depth (i.e., how much information to include in ad); product descriptions (e.g., length, placement, etc.); social proof (e.g., customer/purchaser reviews of product); media mentions; and landing pages. In some embodiments, elements may further include font, colors, ad placement, time and location (e.g., when and where is ad displayed), and audience.

Interaction data 731 may be generated from any interactions between clients and customers and may be stored in any of the three databases 710-730, as necessary.

Figure 8:
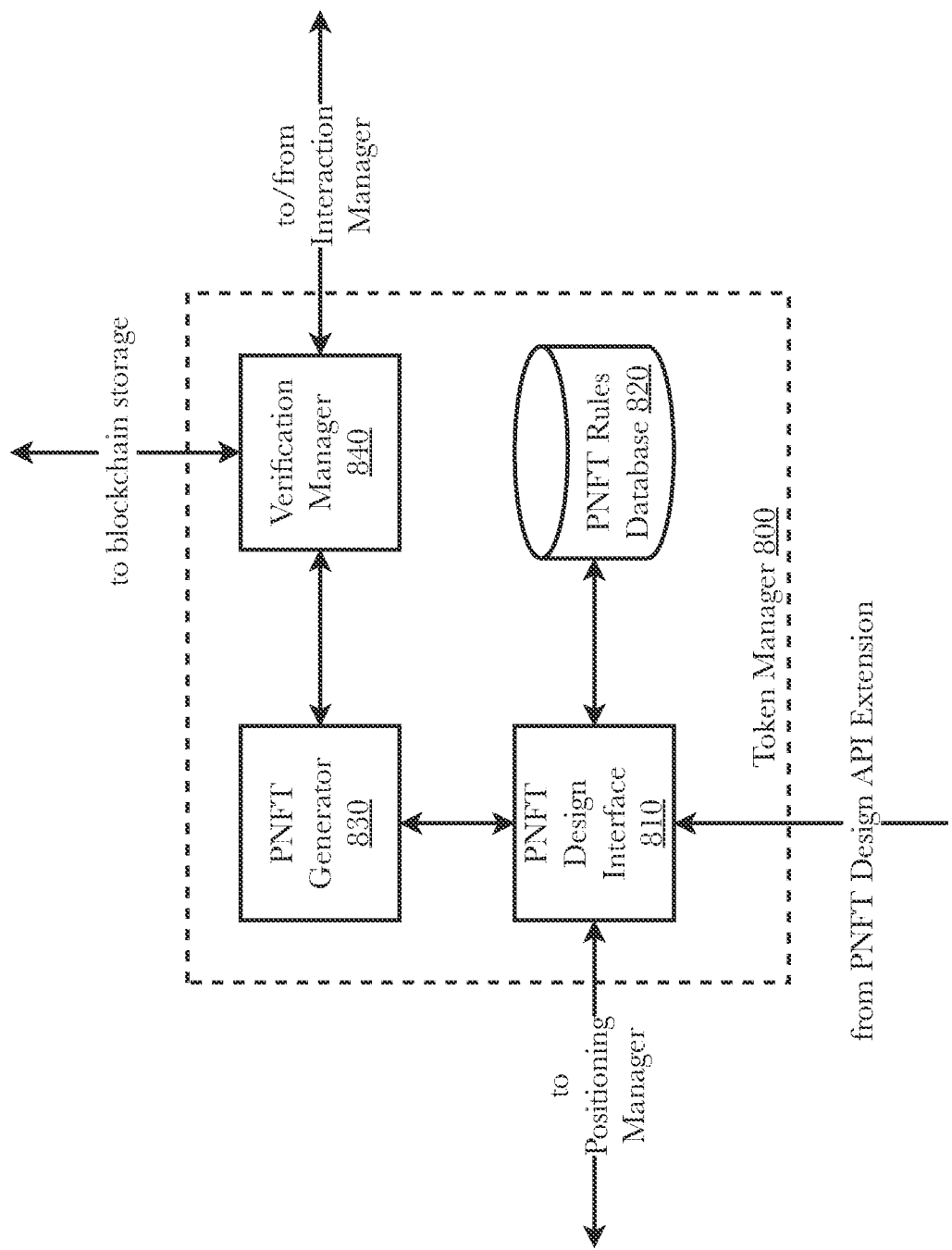
FIG. 8 is an exemplary token manager aspect of a communications and interaction system using SMS-based authorizations and personal non-fungible tokens.

FIG. 8 is an exemplary token manager aspect of a communications and interaction system using SMS-based authorizations and personal non-fungible tokens. The token manager 800 provides an interface for design and generation of PNFTs, establishment of automation rules for interactions with PNFTS, and verification of identities using PNFTs. In this embodiment, the token manager comprises a PNFT design interface 810, a PNFT rules database 820, a PNFT generator 830, and a verification manager 840.

The PNFT design interface 810 may be accessed directly or may be accessed via the PNFT design API extension 512 of the campaign manager 500. The PNFT design interface allows to set up personal non-fungible tokens (PNFTs) as universal, secure identities for online communications, interactions, and exchanges wherein each PNFT uniquely associates an image, sound, or other digital asset with a person's identity using a non-fungible token (NFT). An image, sound, or other digital asset is stored on a blockchain as an NFT, which uniquely and immutably associates the digital asset with the account owning that digital asset, thereby establishing a unique, secure personal identifier (a "personal non-fungible token" or PNFT) of the person owning that account for online communications and interactions. Links to the PNFT (also sometimes herein called "calls to action" or CTAs similarly those associated with marketing campaigns) can be customized via an online platform such that interaction with a given link or type of link initiates automated actions. Further, the online platform can be configured to automatically place the customized links to the PNFT in locations which will facilitate communications and interactions with the owner of the PNFT such as on websites, in communications such as emails and short message service (SMS) communications, and in advertisements and marketing messages.

Similarly to the campaign design APIs 511 of the campaign manager, the PNFT design interface 810 may comprise a graphical interface, rule creation tools, budgeting tools, target audience selection tools, etc., allowing the client to design automated rule sets for individual PNFT CTAs, groups of PNFT CTAs, or types of PNFT CTAs, whereby customer interactions with a given CTA will initiate certain automated actions such as requesting contact with the client, requesting authorization from the client, production of information to the client, or establishment of communications with the client. The CTAs associated with PNFTs operate similarly to CTAs associated with marketing campaigns, but are secure identifiers for a person or entity, and are not necessarily associated with marketing activity. For example, a CTA for a PNFT on a website may contain a company's trademarked logo. Interaction with the CTA provides automatic verification to the person interacting with the CTA that the website is, in fact, owned by the owner of the CTA. Thus, although CTAs for PNFTs can be used for marketing, they function primarily as secure personal identifiers and means for personal interaction with the owner of the PNFT (which can also be a business). The rules for automation of CTAs for PNFTs are stored in a PNFT rules database 820. A PNFT generator 830 generates PNFTs for each client and sends each generated PNFT to a verification manager 840 for verification of the uniqueness of the PNFT (i.e., that there is no duplicate of that particular PNFT for that particular client) and storage of the PNFT as an immutable entry on a blockchain. Because blockchains are immutable and all records of a blockchain are permanently stored on the blockchain, this ensures that each PNFT will be unique. The verification manager 840 also serves to verify the identity of the owner of a given PNFT by verifying the PNFT's identifier on the blockchain. Note that while each PNFT is unique, it is possible for the same person or entity to have more than one PNFT (e.g., the person may have a personal PNFT and also be the owner of multiple businesses, each with its own PNFT).

Figure 9:
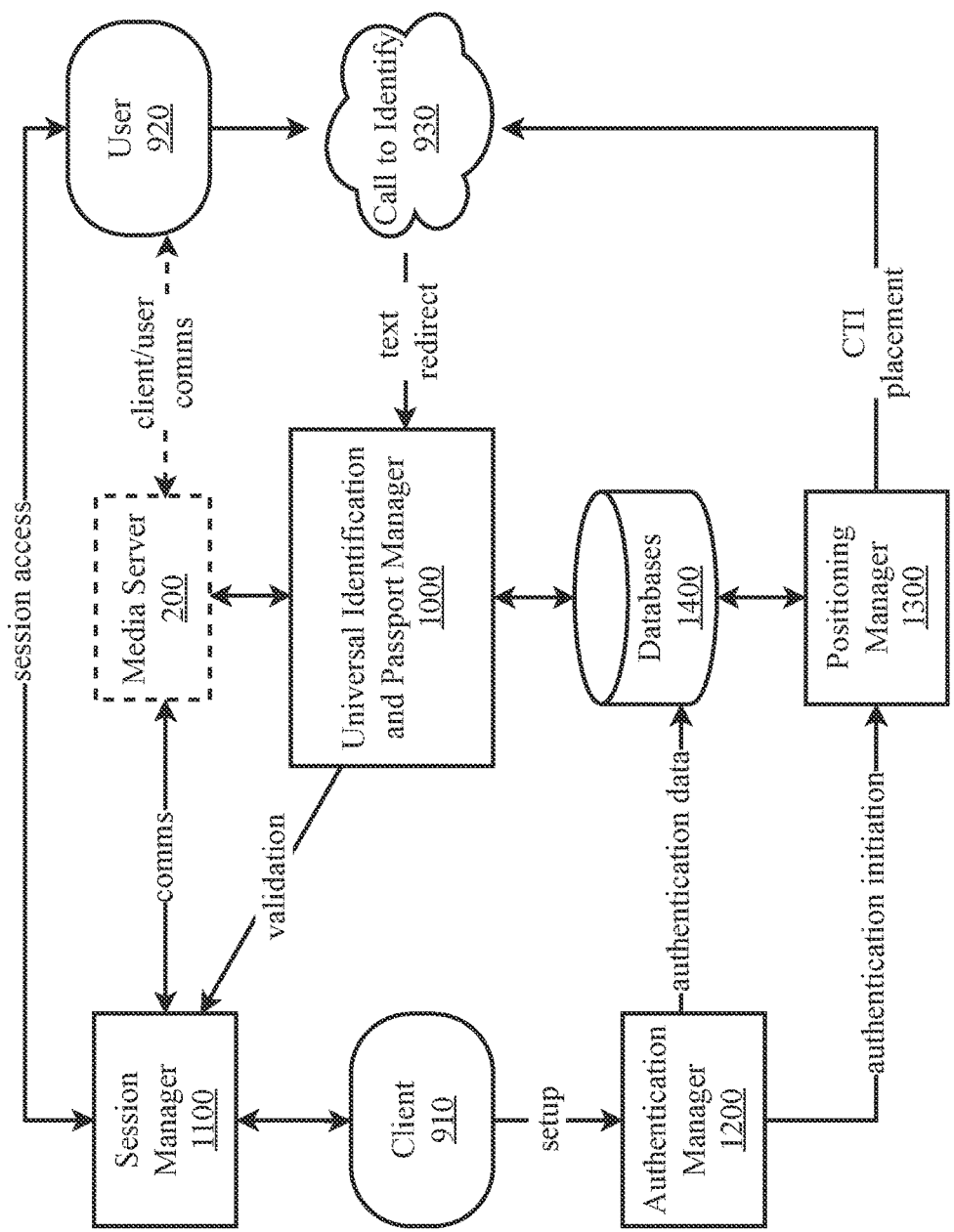
FIG. 9 is an exemplary system architecture of a universal identification and passport management system using a phone identifier and text redirect.

FIG. 9 is an exemplary system architecture of a universal identification and passport management system using a phone identifier and text redirect. In this exemplary embodiment, the system comprises a universal identification and passport manager 1000, a media server 200, a session manager 1100, an authentication manager 1200, a positioning manager 1300, and databases 1400. The system facilitates user identification and access authorization between clients 910 and users 920 using calls to identify 930. A client 910 is any system or app seeking to identify a user and validate their access privileges and which has set up authentication instructions for that purpose. A user 920 is any person seeking to authenticate their identity and receive validated access privileges with a client 910. Identification and authentication between clients 910 and users 920 are initiated by a user's interaction with a call-to-identify (CTI) 930. A CTI 930 means any design to prompt an immediate response or encourage a user device to identify itself and the user with which it is associated. For online and other digital CTIs (e.g., clickable buttons, links, digital sign on, NFC beacons), the CTI 930 will generally be generated and placed by the system in accordance with a client's 910 authentication rules. However, non-electronic CTIs are also possible such as printed CTIs in print advertising, signage, or in-store displays.

The universal identification and passport manager 1000 acts as the validation interface between client and user, validating the user's identity through various identifiers (phone number, international mobile equipment identity (IMEI) code, biometric data, IP address, user identity data). The media server 200 acts as the communication channel interface between client and customer devices, passing various forms of communications media (emails, texts, traditional telephone, VOIP, etc.) between the devices. The session manager 1100 creates and manages each validated session between a client and user by creating a session initiation protocol (SIP) communication session for each validated session between a client and user using the CTI validation, the user's universal identification passport, and information about the client/user communications through the media server 200. The session manager 1100 monitors and logs the session, checks for activity-based de-authentication cues, and de-authenticates the session when an activity-based de-authentication cue is identified and activity is not resumed, the session validation times out based on the client's authentication instructions, or the user ends the session. The authentication manager 1200 provides the client with an interface through which the client may create authentication instructions which may be dynamically adjusted based on feedback from user interactions with CTIs and other information. The positioning manager 1300 creates authentication instances from an instruction, and automatically determines where and when to place CTIs for each authentication instance depending on scheduling, targeting, and budgeting goals. The databases 1400 store authentication instructions, client information, and user information.

Figure 10:
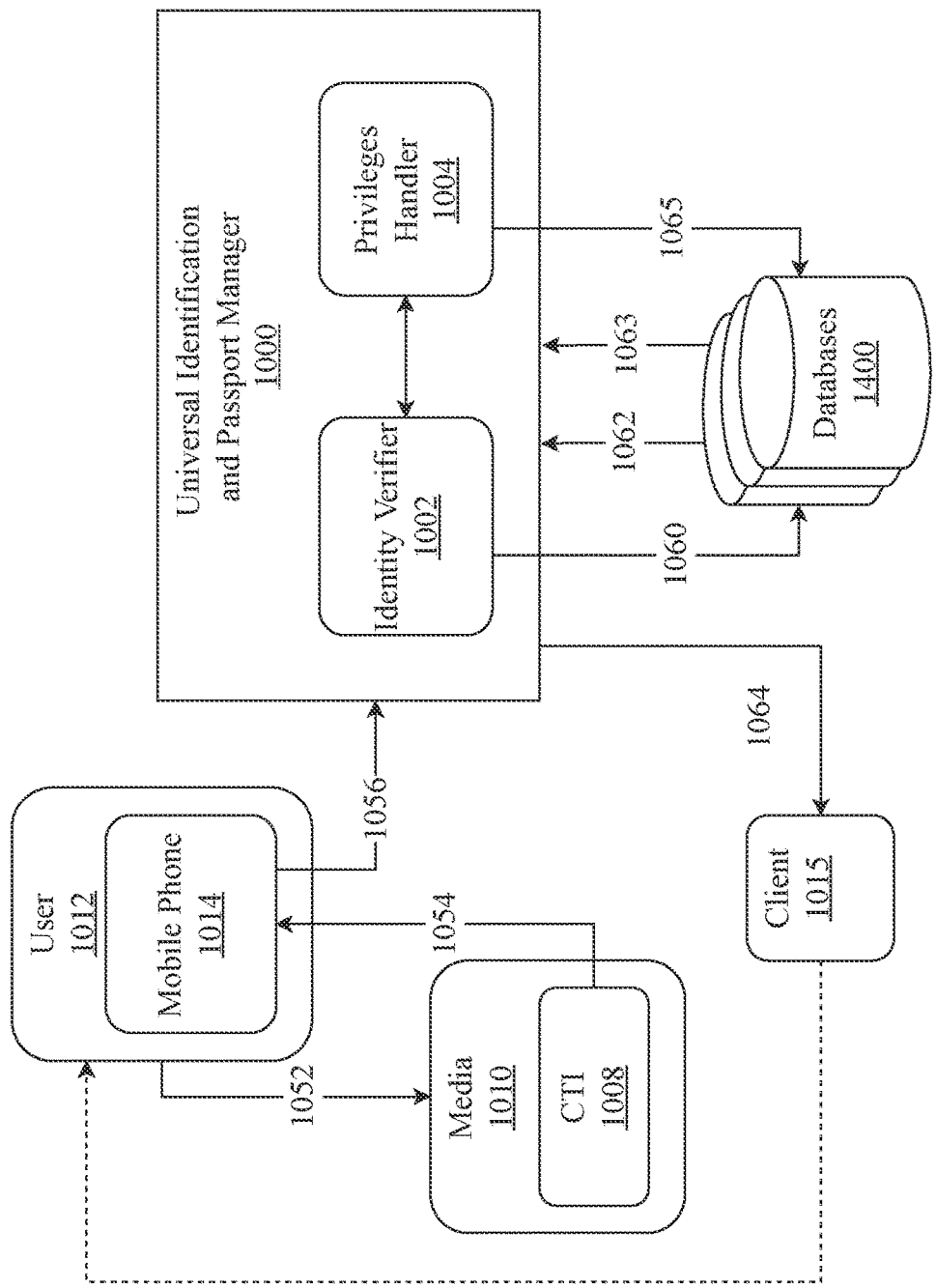
FIG. 10 is a block diagram illustrating an exemplary universal identification and passport manager aspect of a universal identification and passport management system using a phone identifier and text redirect.

FIG. 10 is a block diagram illustrating an exemplary universal identification and passport manager aspect of a universal identification and passport management system using a phone identifier and text redirect. Universal identification and passport manager 1000 links to an initiating "call-to-identify" (CTI) 1008 associated with a request for user authentication. A CTI 1008 may be embedded in media 1010 of various forms, a preferred form being a NFC-enabled beacon broadcasting the CTI or a scannable QR code, however, other forms are anticipated including, but not limited to, a clickable button hosted on a website or a clickable link served via email which, on user interaction, triggers a text redirect, executing code to propagate an SMS or MMS message on the user's mobile phone or device containing an authentication identifier.

Initialization of universal identification and passport manager 1000 comprises storing authorization instructions and user information, including user identity and user privilege data, in databases 1400 and everything related to the authorization (e.g., procedures, instructions, rules, initiator ID, etc.) is called a procedure 1080. The identifier may be autogenerated by an algorithm, or taken sequentially from a list, or other methods known to those in the art. Additionally, each procedure must have at least stored authentication instructions for identifying a user 1012 through their mobile phone 1014 using at least the identifier, the user's phone number, and the user's device MEI. Other factors may be utilized including but not limited to location-based services, facial recognition, previous user interactions and session data and so forth.

A CTI 1008 containing the unique identifier may be generated embedded in appropriate media 1010 for the client's authentication and security goals. A non-exhaustive list includes printed materials such as billboards, posters, and flyers; and electronic means such as clickable buttons, advertisements, URLs, push notifications, etc.

With the universal identification and passport manager 1000 initialized, a user 1012 will observe media 1010 containing a CTI 1008 and use his or her mobile phone or device 1014 to engage 1052 with the media 1010 and trigger the CTI 1008, for example scanning a QR code, which will cause the device 1014 to perform a text redirect by propagating a text message 1054 with destination and content including at least the identifier associated with the specific CTI instance. The user 1012 need only press the send key/button to send the message 1056. The message sent 1056 from the user's mobile phone 1014 is received by the universal identification and passport manager 1000 which logs at least the user's phone number and device IMEI from the message 1056. This data is first passed to an identity verifier 1002 which queries 1060 a user database 1400 using the phone number and device IMEI and returns a user identity 1062. The identity verifier 1002 also queries 1060 an authentication database 1400 using the identifier to return a specific set of authentication instructions 1063. The identity verifier 1002 uses the returned data to validate the user identity using the stored data associated with the specific user 1012 and by following the authentication instructions 1063. In one embodiment, the universal identification and passport manager then notifies 1064 the client 1015 of the successful verification and the client acts based on that notification. In another embodiment, the identity verifier 1002 passes the successful verification to the privileges handler 1004 for privilege management handled within the universal identification and passport manager 1000, such as saving login credentials for an online service or website to the user database 1400. Other privilege handling functions include updating 1065 the user information with new privileges, increased or decreased privileges, or removing stored privileges from the user's saved information. In one example, a client which is a website sets up authenticate via Whisp which enables users to create an account using the universal identification and passport manager. The user, while visiting the website using their mobile phone, clicks a button or text to initiate the authentication protocol, propagating the text message on the user's phone. The user taps the send button, prompting the universal identification and passport manager to retrieve the client's saved authentication instructions, identify the user by providing at least the user's phone number to the client, and grant new account privileges and save them to the user identity profile stored in the user database. At the same time, the user may opt in to receive marketing messages from the client via SMS or MMS. This method provides the user with increased ease of identification as well as increased security by reducing the amount of user data stored across client accounts.

Figure 11:
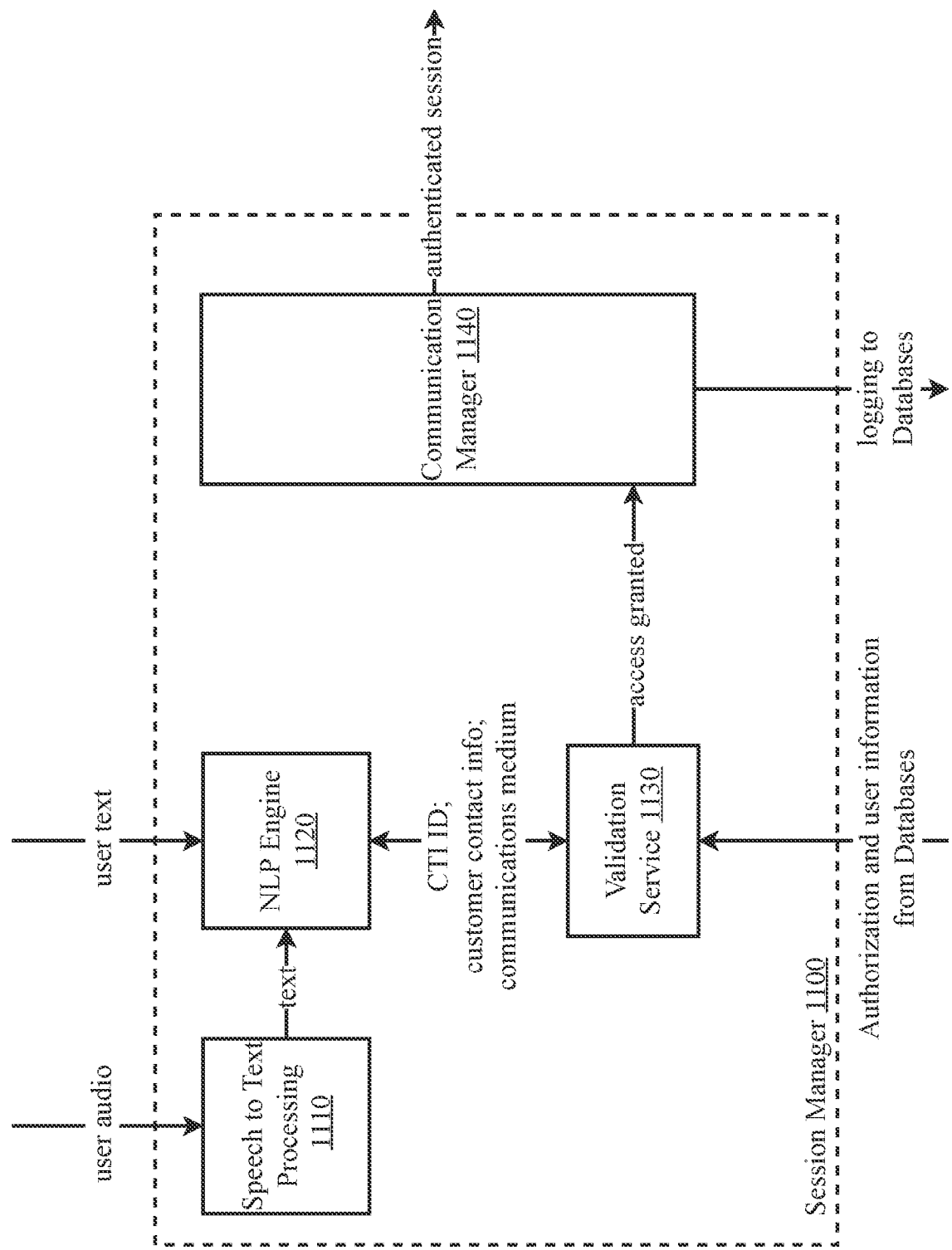
FIG. 11 is an exemplary session manager aspect of a universal identification and passport management system using a phone identifier and text redirect.

FIG. 11 is an exemplary session manager aspect of a universal identification and passport management system using a phone identifier and text redirect. The session manager 1100 creates and manages authenticated sessions between a client and user by creating a session initiation protocol (SIP) communication using the CTI identifier, the user's identification and privilege information, and information about the resources being accessed. The session manager 1100 monitors and logs the session, and terminates the session when the authentication expires or de-authentication is triggered, such as when a time-limited authentication reaches the maximum allotted time without renewal by the user, when there has been no user activity for a client-specified amount of time, the user has left the physical location, the user has entered a different authorization area, the user has accepted an SMS offer to de-authenticate, or the user has interacted with a CTI embedded with de-authentication instructions, such as tapping out of a service or location. The session manager 1100 may also manage multi-authentication sessions where the user interacts with a multi-session CTI and the session manager passes the user identification data to automatically identify the user for each successive CTI interaction. For example, a security guard patrolling a shopping mall may interact with a CTI to open a multi-session CTI for the duration of a scheduled shift, where the shopping mall uses NFC beacons to limit access to storage rooms, non-public entry points or corridors, individual units, etc. After the security guard completes the initial multi-session CTI, the security guard is identified and authorized. The authorization may be limited to a specific time frame before requiring a renewal, which may be performed via SMS request from the universal identification and passport manager with an SMS response from the user. During the authenticated period, the security guard may access any resource for which privileges were initially identified; approaching an NFC-enabled locked door while carrying the user computing device will unlock the door for the security guard to pass through. Passively triggering another CTI embodied in an NFC beacon on the other side of the door may lock the door behind the security guard. This multi-session CTI may be de-authenticated following de-authentication instructions set by the client, such as on deviation from the anticipated access route or time between access points, requiring re-authentication to continue or triggering a notification to the client of a deviation.

In this embodiment, the session manager comprises a natural language processing (NLP) engine 1120, a target selector 1130, and a communication manager 1140.

In an embodiment, an identifier for the CTI is obtained from a text message from the user following an interaction with a CTI and the text from the interaction with the CTI is sent to a natural language processing engine 1120 which parses the text to extract the CTI ID and possible other contextual information (such as additional authentication added to the identification by the client, e.g., a passcode or security phrase automatically embedded in the propagated SMS, added to the SMS by the user, or requested via SMS following the initial SMS and subsequently provided by the user) along with the user identification information. Using the CTI identifier, the authentication instructions associated with the CTI identifier and user identification and privileges information are retrieved from a database for the relevant access point, and a validation service verifies that the user identification and privileges satisfy the requirements listed in the authentication instructions. Access is granted after validation succeeds. A communication manager 1140 of the session manager 1100 may then initiate an authenticated session between the client and user, monitor and log the session, renew or de-authenticate the user's access, and terminate the session. In another embodiment, a user may interact by sending voice notes or audio clips rather than a text message which is then passed through speech to text processing 1110 and converted to text and passed to the NLP engine 1120.

Figure 12:
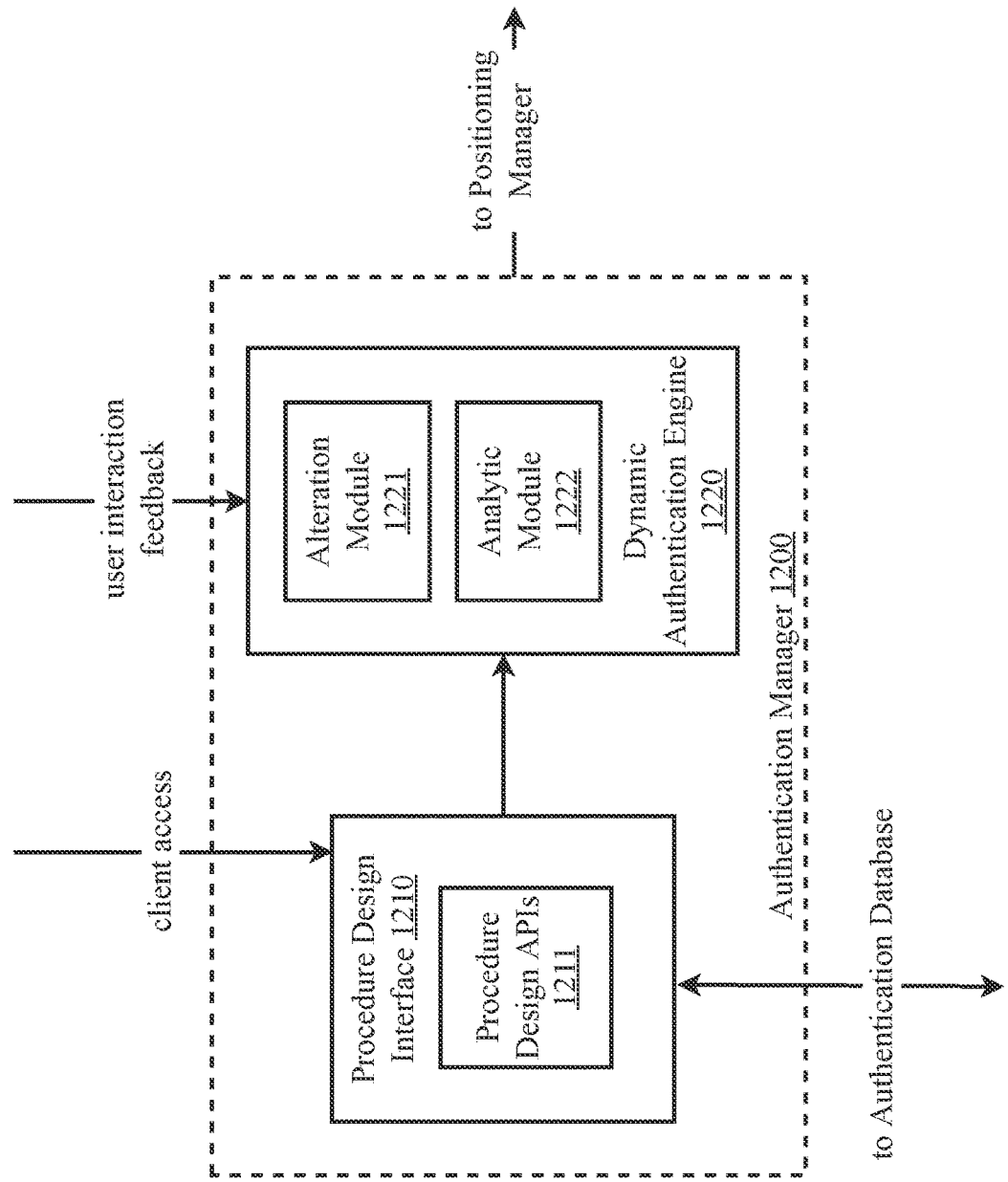
FIG. 12 is an exemplary authentication manager aspect of a universal identification and passport management system using a phone identifier and text redirect.

FIG. 12 is an exemplary authentication manager aspect of a universal identification and passport management system using a phone identifier and text redirect. This diagram is derived from the previous system architecture diagram of FIG. 26 of the parent application (63/319,314) and prior applications that have been incorporated herein by reference. The authorization manager 1200 provides the client with an interface through which the client may create automated authentication procedures which may be dynamically adjusted based on feedback from user interactions with CTIs and other information. In this embodiment, the procedure manager comprises a procedure design interface 1210 and a dynamic authentication engine 1220.

The procedure design interface 1210 comprises one or more procedure design APIs 1211 which allow clients to set up procedures comprising location and service access, account logins, privilege requirements, authentication instructions, maps of authentication systems including access points and area restrictions, etc. Each procedure design API 1211 provides one or more aspects of the interface such as a graphical interface, requirements or instructions creation tools, mapping tools, credential conversion tools, etc., and the collection of the procedure design APIs 1211 allows the client to define complete authentication procedures, which are stored in the authentication database of the databases 1400.

Once an authentication procedure is created and implemented, the dynamic authentication engine 1220 can be configured to make automatic changes to the procedures (or an aspect of a procedure) based on feedback from interaction with CTIs and other information such as session data. In some embodiments, authentication variants may be generated manually or semi-autonomously with input from the client. For example, dynamic authentication engine 1220 may receive data associated with an authentication procedure and analyze it, and based on the analytic data it may suggest an element to be altered by alteration module 1221, which can then be reviewed and implemented by a client representative such as an IT manager or security manager. In some embodiments, authentication variants may be generated autonomously. For example, dynamic authentication engine 1220 may receive analytic data associated with an authentication procedure and based on the received data it may suggest an element of an authentication to be altered by alteration module 1221, which can be automatically applied to the authentication via the authentication procedure data stored in authentication database 1410.

A purpose of utilizing authentication variants is to gather useful data about the efficacy, efficiency, and security of a given authentication and/or an authentication procedure. Implementing two similar authentications with the only difference between the two being a single element alteration (i.e., A/B testing) can allow clients to understand how elemental choices for an authentication affect client interaction. For example, an authorization procedure for an online streaming service may be developed to enable clients to more easily and securely identify themselves to access their accounts from new or temporary locations and a variant authorization may be developed embodying the CTI in a different method or requiring different identification information to grant access. Both the baseline authentication and the variant authentication can then be deployed and user engagement data with both the baseline and variant can be monitored and analyzed to determine which of the baseline or the variant led to better outcomes for the client requiring the identification. In some embodiments, test plans may be received, retrieved, or otherwise obtained from authentication database 1410 by dynamic authentication engine 1220 as an input into suggesting element alterations.

According to some embodiments, the analytic module 1222 may receive, retrieve, or otherwise obtain a plurality of data such as, but not limited to, details of interactions with CTIs, interaction data, session data, and authentication data, and may process the plurality of data in order to determine the efficacy of a given authentication and/or authentication procedure. In some embodiments, analytic module 1222 may receive data pertaining to at least two authentications comprising a baseline authentication and a variant authentication, and determine which of the two authentications produced better results based upon analysis of the received data.

Figure 13:
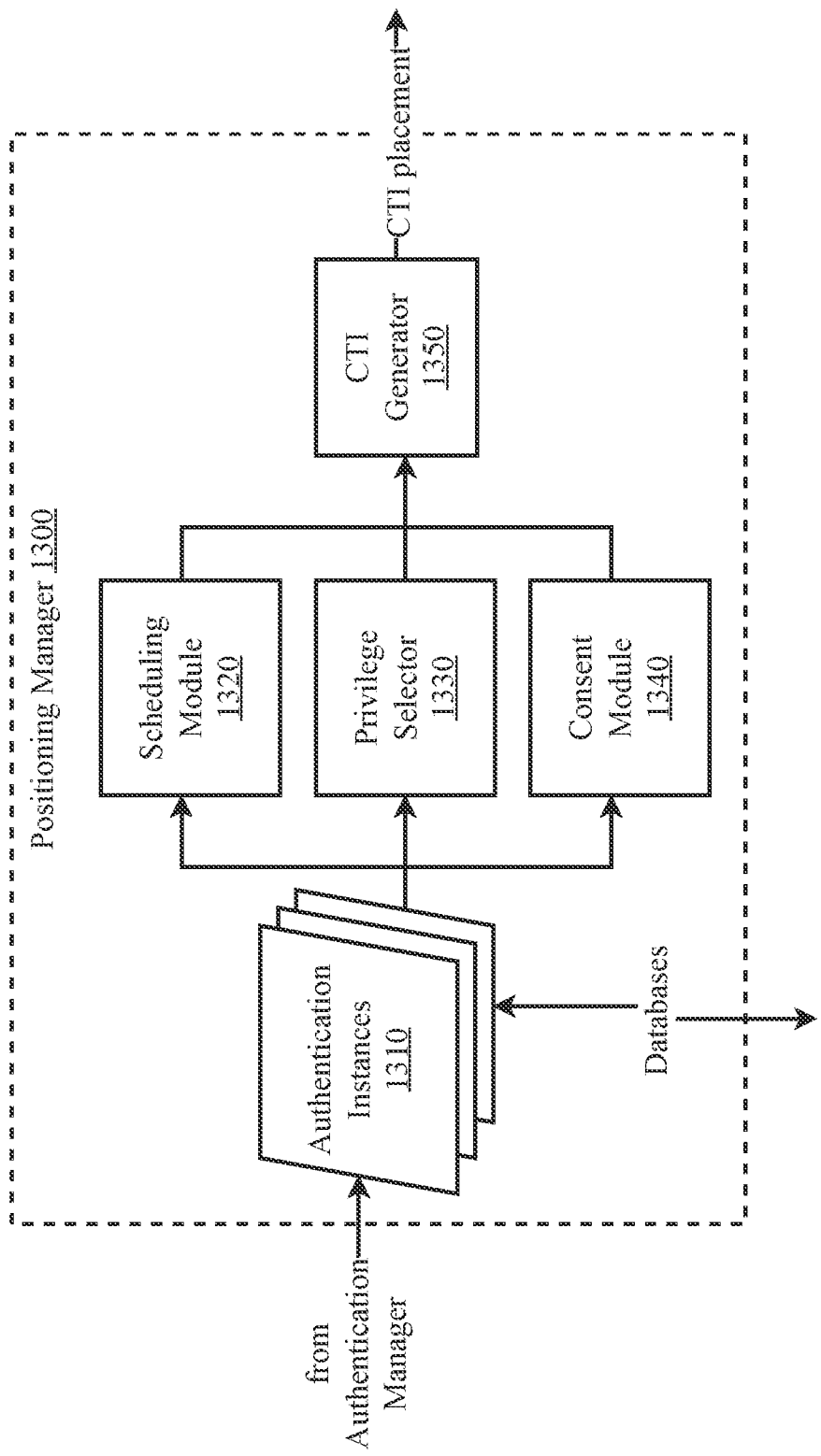
FIG. 13 is an exemplary positioning manager aspect of a universal identification and passport management system using a phone identifier and text redirect.

FIG. 13 is an exemplary positioning manager aspect of a universal identification and passport management system using a phone identifier and text redirect. In this embodiment, the positioning manager 1300 creates authentication instances from a client's authentications, and automatically determines where and when to place CTIs for each authentication instance depending on scheduling, privilege, and communication goals.

The positioning manager 1300 receives notification of the initiation of an authentication scheme from the authentication manager, retrieves relevant information about the authentication from the databases 1400, and creates one or more authentication instances 1310 for implementation of the authentication. Not all authentication will have multiple instances. Depending on the authentication configuration, each authentication instance will represent some portion or division of the authentication for implementation. For example, in an authentication scheme for a bank location, instances may be generated for different physical areas which will be assigned different schedule or privilege requirements for granting access, such as time limiting patron access to teller-assisted banking areas or requiring employee privileges to access certain areas. Authentication instances 1310 will typically have rules associated with scheduling, privileges, and communications. In this embodiment, each instance is analyzed by a scheduling module 1310 to identify scheduling rules and constraints and output an authentication schedule, a privilege selector 1330 to identify privilege requirements and output a required privileges selection range, and a consent module 1340 to identify communication requests for the instance and output requested communications for obtaining user consent within the instance. The outputs of the scheduling module 1320, privilege selector 1330, and consent module 1340 are sent to a CTI Generator 1350 which generates an appropriate CTI to a user mobile device in accordance with the client's authentication parameters.

Figure 14:
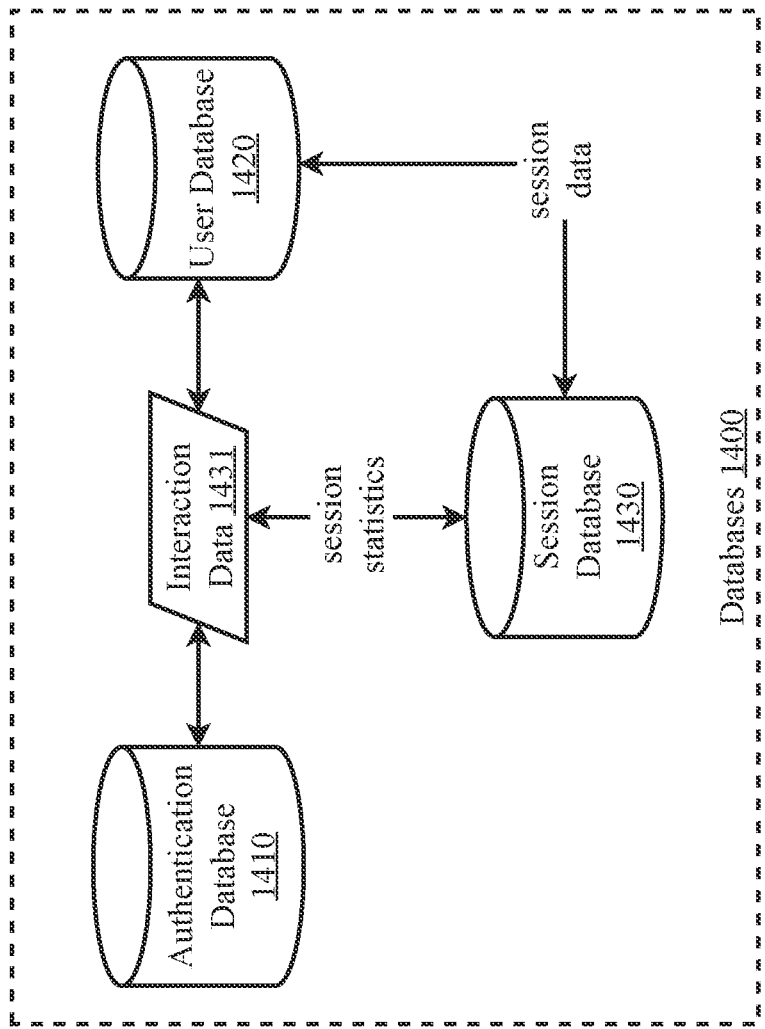
FIG. 14 is an exemplary set of databases for a universal identification and passport management system using a phone identifier and text redirect.

FIG. 14 is an exemplary set of databases for a universal identification and passport management system using a phone identifier and text redirect. The databases 1400 store authentication information, user information, and session information.

The authentication database 1410 comprises information about the client for facilitating identification between clients and users such as client credential requirements; instructions for authentication a user computing device; maps of authentication systems including access points and area restrictions; and additional authentication information such as time limitations, renewal allowances, and privilege requirements. The authentication database 1410 may be configured to store a plurality of authentication instructions including the associated authentication instructions for each authentication instance. In some embodiments, the authentication instructions specify a plurality of accesses that will be granted to the user computing device.

The authentication database 1410 may take the form of a managed or unmanaged database, document-oriented database system, or SQL database, or other suitable form of database. Examples of types of database software that may operate include MYSQL™, ORACLE DATABASE™, MONGODB™, and others. The authentication database 1410 may exist as a distinct physical device or be operating on another computing device that may perform other functions aside from operating, hosting and serving the authentication database 1410. If the authentication database 1410 is a distinct physical device, the database may be connected over a LAN or WAN, the Internet, a direct physical connection to another device, or some other network connection. The authentication database 1410 may be a centralized database system. The authentication database 1410 may be a distributed database system.

The user database 1420 comprises information about users for facilitating identification and communication between clients and user computing devices. This information is stored in a user identity profile. Each profile must include at least the user's phone number and device IMEI but may further include such information as the user's IP address, name, address, shipping address, billing information, contact information, user preferred contact method (e.g. mobile phone, e-mail), user previous interaction history, and user privileges granted on third-party client systems.

The session database 1430 comprises information about previous sessions for facilitating identification between clients and user computing devices, identifying authentication issues, optimizing client communications.

Interaction data 1431 may be generated from any interactions between clients and user computing devices, and may be stored in any of the three databases 1410-1430, as necessary.

Figure 15:
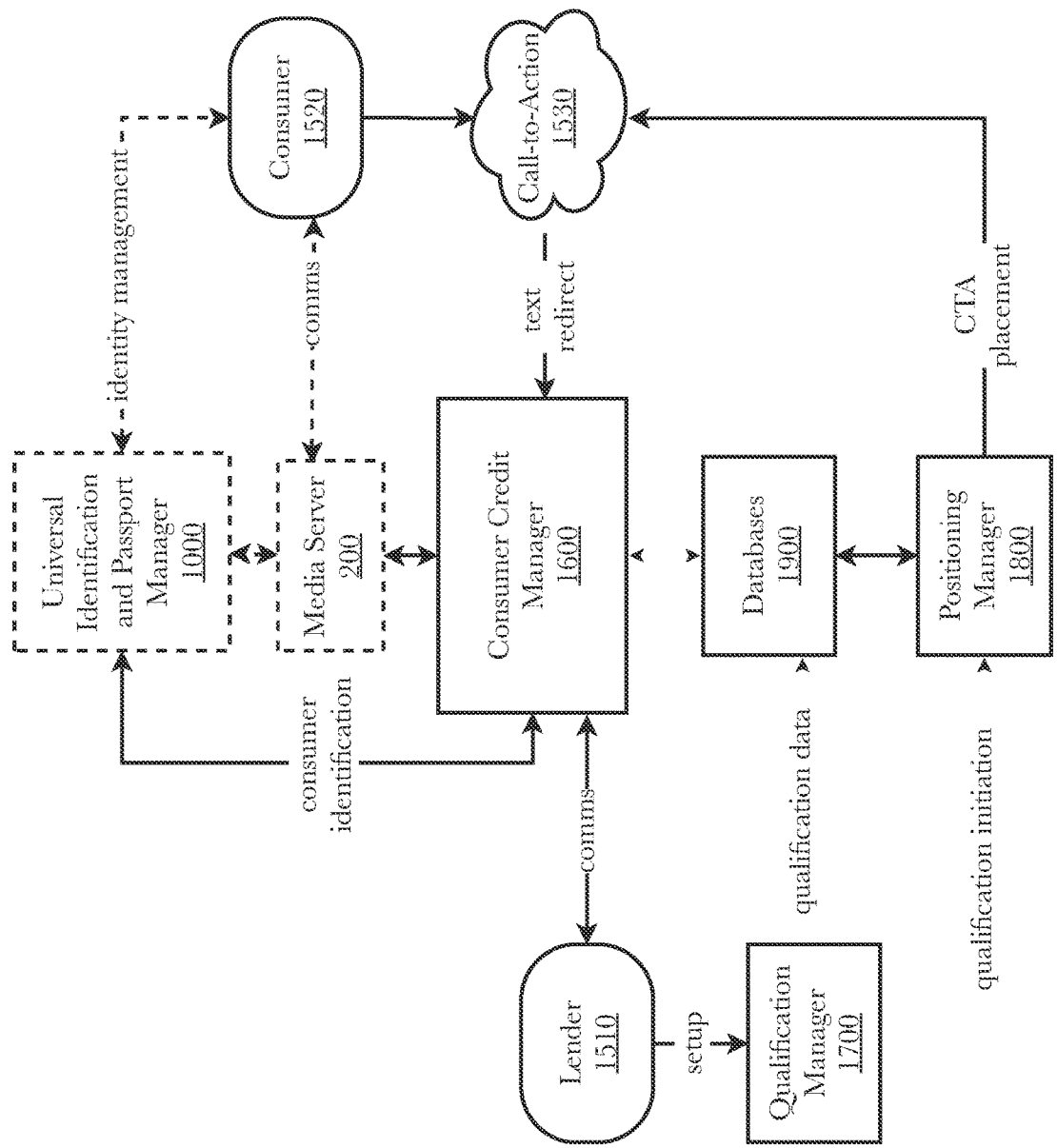
FIG. 15 is an exemplary system architecture of a soft credit approval system using text redirect.

FIG. 15 is an exemplary system architecture of a soft credit approval system using text redirect. In this exemplary embodiment, the system comprises a consumer credit manager 1600, a media server 200, a universal identification and passport manager 1000, a qualification manager 1700, a positioning manager 1800, and databases 1900. The system facilitates soft credit approval for consumers 1520 with lenders 1510 using calls-to-qualify 1530. A lender 1510 is any organization engaging in lending to consumers 1520 including financial institutions, banks, finance companies, merchants, retailers, etc. A consumer 1520 is any person seeking to prequalify for lending through a lender 1510 using soft credit approval methods prior to authorizing a hard inquiry on the consumer's 1520 credit report. Identification and qualification between lenders 1510 and consumers 1520 are initiated by a consumer's interaction with a call-to-action (CTA) 1530. A CTA 1530 means any design to prompt an immediate response or encourage a consumer to initiate a pre-qualification process using the consumer's device to provide consumer identification and qualification information for the consumer with which it is associated. For online and other digital CTAs (e.g., clickable buttons, links, scannable QR codes, and NFC beacons), the CTA 1530 will generally be generated and placed by the system in accordance with a lender's 1510 qualification rules. However, non-electronic CTAs are also possible such as printed CTAs in print advertising, signage, or in-store displays.

The consumer credit manager 1600 acts as the validation interface between lender and consumer, validating the consumer's creditworthiness through various financial information (e.g., soft credit pull, verified bank balance, paycheck stub or confirmed direct deposit history, credit score, credit history, transaction history, payment history, outstanding debt, length of credit history, new accounts, types of credit used, FICO score, annual income, and employment history). The media server 200 acts as the communication channel interface between lender and consumer devices, passing various forms of communications media (emails, texts, traditional telephone, VOIP, etc.) between the devices. The universal identification and passport manage 1000 acts as an optional identification and validation interface between lender and consumer, validating the consumer's identity through various identifiers (e.g., phone number, IMEI, biometric data, IP address, user identity data, user financial information, etc.). The qualification manager 1700 provides the lender with an interface through which the lender may create qualification instructions which may be dynamically adjusted based on feedback from consumer interactions with CTAs and other information. The positioning manager 1800 creates qualification instances from an instruction, and automatically determines where and when to place CTAs for each qualification instance depending on targeting, approval, and payment goals. The databases 1900 store lender information (qualification instructions, credit application questions, etc.) and consumer information.

Figure 16:
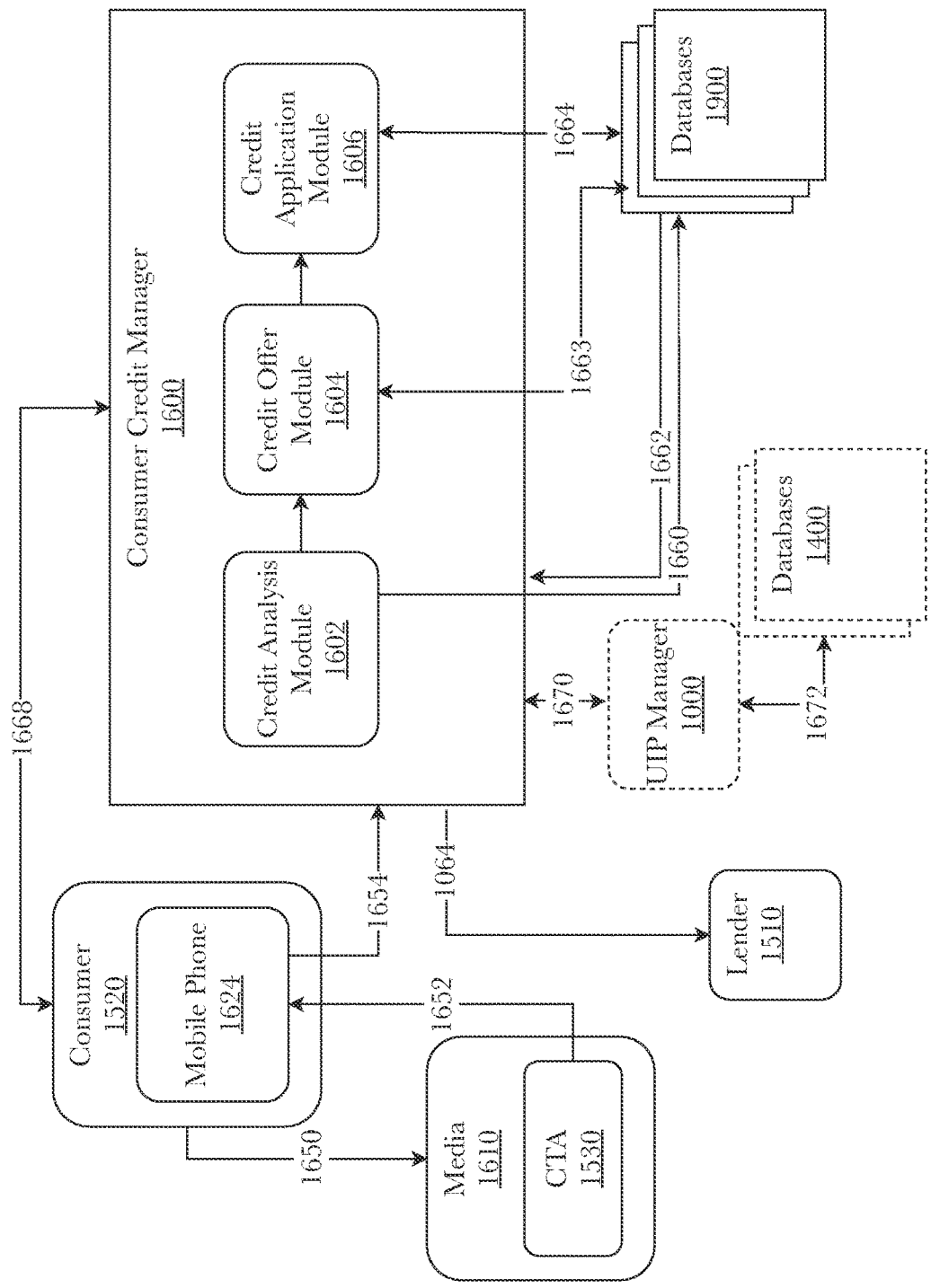
FIG. 16 is a block diagram illustrating an exemplary consumer credit manager aspect of a soft credit approval system using text redirect.

FIG. 16 is a block diagram illustrating an exemplary consumer credit manager aspect of a soft credit approval system using text redirect. Consumer credit manager 1600 links to an initiating "call-to-action" (CTA) 1530 associated with a request for consumer identification and/or consumer financial information. A CTA 1530 may be embedded in media 1610 of various forms, a preferred form being a scannable QR code or a NFC-enabled beacon broadcasting the CTA, however, other forms are anticipated including, but not limited to, a clickable button hosted on a website or a clickable link served via website or email which, on consumer interaction, triggers a text redirect, executing code to propagate an SMS or MMS message on the consumer's mobile phone or device containing a qualification identifier.

Initialization of consumer credit manager 1600 comprises storing qualification instructions and consumer information, including consumer identity and consumer financial data, in databases 1900 and everything related to the qualification (e.g., procedures, instructions, rules, criteria, initiator ID, etc.) is called a procedure. The identifier may be autogenerated by an algorithm, or taken sequentially from a list, or other methods known to those in the art. Additionally, each procedure must have at least stored qualification instructions for qualifying a consumer 1520 using at least some consumer financial information and the identifier. Other factors may be utilized including but not limited to location-based services, available API integrations, the consumer's universal identity profile and so forth.

A CTA 1530 containing the unique identifier may be generated embedded in appropriate media 1610 for the lender's qualification and lending goals. A non-exhaustive list includes printed materials such as billboards, posters, and flyers; and electronic means including clickable buttons, advertisements, URLs, push notifications, etc.

With the consumer credit manager 1600 initialized, a consumer 1520 will observe media 1610 containing a CTA 1530 and use a device particularly a mobile phone 1624 to engage 1650 with the media 1610 and trigger the CTA 1530, for example scanning a QR code, which will cause the device 1624 to perform a text redirect by propagating a text message 1652 with destination and content including at least the identifier associated with the specific CTA instance and consumer financial information. In one embodiment, the consumer financial information may be retrieved from an API integration with the consumer's mobile banking app or credit monitoring app on the consumer's mobile phone 1624. In another embodiment, the consumer financial information is retrieved from a database 1900 using the consumer's phone number captured from the SMS or MMS and the consumer's IMEI added to the text message 1652. The consumer 1520 need only press the send key/button to send the message 1654. The message sent 1654 is received by the consumer credit manager 1600 which logs at least the user's phone number. The data is first passed to a credit analysis module 1602 which queries 1660 a qualification database 1900 using the identifier to return a specific set of qualification instructions 1662. The credit analysis module 1602 uses the returned data to analyze the consumer financial information by following the qualification instructions 1662 which contain at least a plurality of lending criteria and an approval procedure. In one embodiment, the consumer credit manager 1600 then notifies the lender 1510 of the successful qualification and the lender acts based on that notification. In another embodiment, the CTA 1530 performs a text redirect by propagating a text message 1652 with destination and content including at least the identifier associated with the specific CTA instance and the consumer's device IMEI. The credit analysis module 1602 following the qualification instructions 1662 requests 1670 consumer financial information stored in the consumer's universal identity passport by contacting a universal identity and passport (UIP) manager 1000 which queries 1672 a user database 1400 using at least the consumer's phone number and IMEI to return the requested consumer financial information associated with the consumer's identity profile. The credit analysis module 1602 then analyzes the returned consumer financial information using the lending criteria and approval procedure of the qualification instruction 1662. If the consumer financial information satisfies the lending criteria and the approval procedure is successfully completed, the consumer credit manager 1600 may notify the lender 1510. In a potential second step, the credit analysis module 1602 passes its results to a credit offer module 1604 which queries an offer database 1900 using the identifier for a plurality of credit offer information associated with the lender 1510. Using the credit analysis results, the credit offer module may select a matching saved credit offer from the credit offer information or generate an individualized credit offer following the lending criteria and qualification instruction 1662. The consumer credit manager then communicates 1668 the credit offer to the consumer, who may respond to act on the offer by authorizing the consumer credit manager 1600 to apply for the offer using the consumer's identity profile. If the consumer responds affirmatively to the credit offer communication 1668, then the credit application module 1606 retrieves credit application information 1664 stored in an application database 1900 and communicates 1670 with the UIP manager 1000 to automatically complete the application and submit 1064 it to the lender 1510.

In one example, the CTA corresponds to a specific credit offer, such as a request for soft credit approval to receive credit covering the cost of a specific purchase. The purchase could be for a particular item, such as a particular vehicle at an auto dealership assigned a QR code or NFC beacon with which the consumer interacts to check whether they will likely qualify for an auto loan for the vehicle. Alternately, the purchase could be for a bundle of items or services or for a total transaction amount. In this example, a consumer shopping online may select a soft credit approval option during checkout to check whether they will likely qualify for store credit covering the transaction. These scenarios exemplify pre-generated credit offers which may be stored in the offer database 1920 and incorporated into a CTA 1530 or retrieved using the identifier. However, credit offers may be generated based on information about an individual consumer, including the consumer's universal identity profile containing consumer financial information such as confirmed salary, regular direct deposit details, current bank account balance, spending activity, home ownership, renter status, total monthly income, total monthly expenditures, etc. A consumer may opt to input and verify this information to their universal identity profile for various purposes, including for use in soft credit approvals and automated credit applications. In a soft credit approval using a consumer's universal identity profile, the consumer credit manager 1600 communicates with the universal identity and passport manager 1000 to retrieve the consumer's saved financial information, analyze the consumer's qualifications for receiving credit, generate individualized pre-qualified credit offers, and automatically complete credit applications when the consumer chooses to act on a credit offer. For example, a consumer may qualify for a reduced credit rate based on lending criteria which identifies the consumer as a low lending risk due to financial information such as a higher total monthly income than the consumer's total monthly expenditures and low credit balance or a payment history showing consistency in making full payments on time. In one embodiment, a consumer interacting with a CTA integrated with the universal identification and passport manager may receive multiple credit offers with a variety of credit limits, rates, term lengths, and special bonus offers generated based on the consumer's financial identity. When a consumer additionally opts in to receiving communications from a lender, the consumer may also receive additional offers based on lending criteria and other data, such as a bundled offer combining the CTA-initiated approved credit offer with additional products or services consumers typically purchase in addition to the initial credit offer.

In other words, a request to qualify a consumer is received which comprises information enabling the consumer credit manager to retrieve instructions containing qualification procedures for qualification of the consumer's creditworthiness. With the proper instructions selected, the consumer credit manager analyzes the appropriate qualification data received from the consumer or retrieved from stored consumer data and verified through an integration or consumer identity verification process. This analysis may be further used to extend a prequalified credit offer to the consumer. If the consumer acts on the prequalified credit offer, then the consumer credit manager prepares the consumer's credit application and submits it to the lender for final approval.

Figure 17:
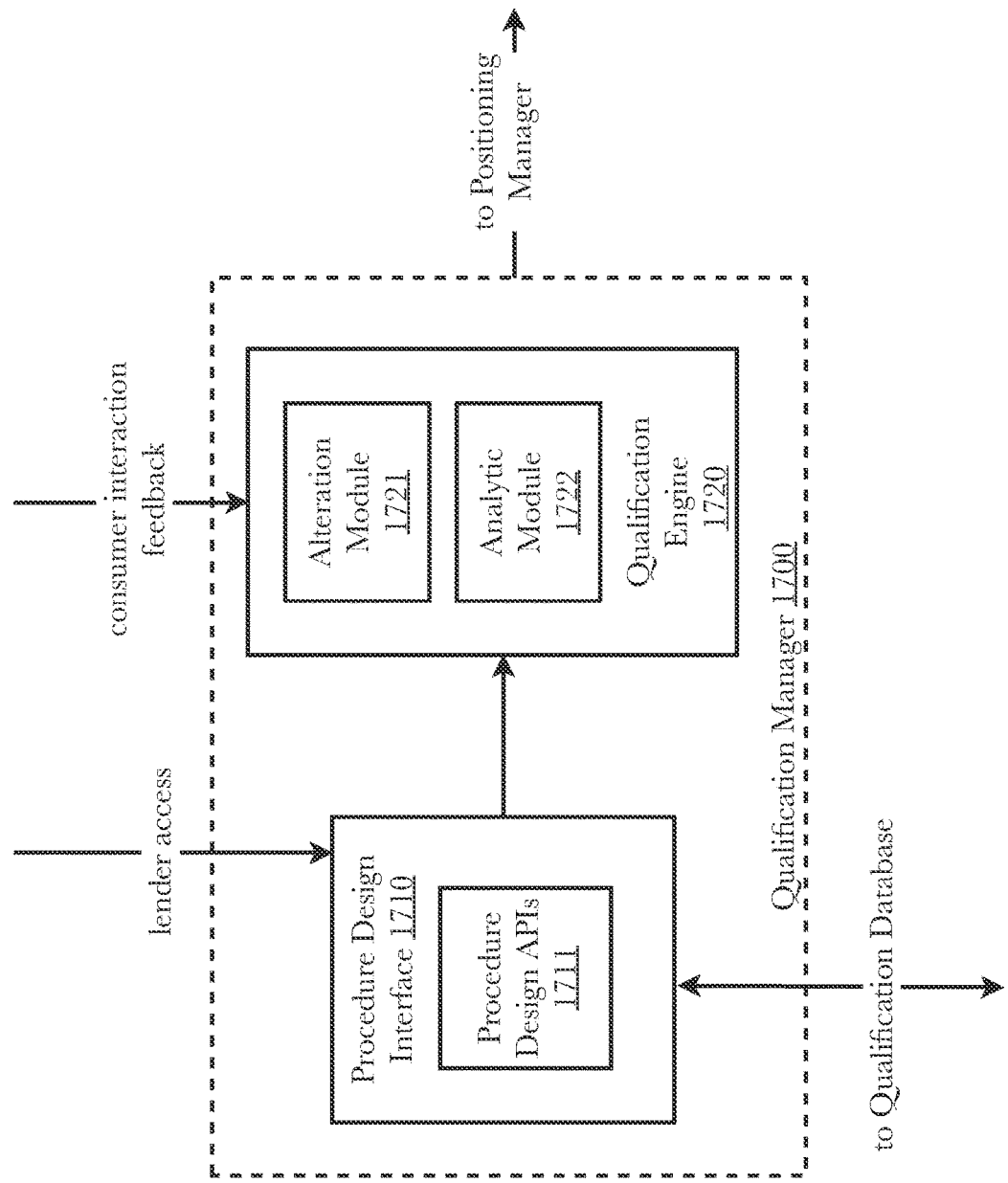
FIG. 17 is an exemplary qualification manager aspect of a soft credit approval system using text redirect.

FIG. 17 is an exemplary qualification manager aspect of a soft credit approval system using text redirect. This diagram is derived from the previous system architecture diagram of FIG. 26 of the parent application (63/319,314) and prior applications that have been incorporated herein by reference. The qualification manager 1700 provides the lender with an interface through which the lender may create automated soft qualification procedures which may be dynamically adjusted based on feedback from consumer interactions with CTAs and other information. In this embodiment, the qualification manager comprises a procedure design interface 1710 and a dynamic qualification engine 1720.

The procedure design interface 1710 comprises one or more procedure design APIs 1711 which allow lenders to set up procedures comprising qualification instructions, lending criteria, etc. Each procedure design API 1711 provides one or more aspects of the interface such as a graphical interface, requirements or instructions creation tools, criteria tools, etc., and the collection of the procedure design APIs 1711 allows the lender to define complete qualification procedures, which are stored in the qualification database of the databases 1900.

Once a qualification procedure is created and implemented, the dynamic qualification engine 1720 can be configured to make automatic changes to the procedures (or an aspect of a procedure) using alteration module 1721 based on feedback from interaction with CTAs and other information such as consumer offer actions, lender application rejections, credit approvals, etc. In some embodiments, qualification variants may be generated manually or semi-autonomously with input or approval from the lender. For example, dynamic qualification engine 1720 may receive data associated with a qualification procedure and analyze it, and based on the analytic data it may suggest an element of a qualification to be altered by alteration module 1721, which can be automatically applied to the qualification via the qualification procedure data stored in the qualification database 1910 or provided to the lender for review and approval through the procedure design interface 1710.

A purpose of utilizing qualification variants is to gather useful data about the efficacy, efficiency, and accuracy of a given qualification and/or qualification procedure. Implementing two similar qualifications with the only difference between the two being a single element alteration (i.e., A/B testing) can allow lenders to understand elemental choices for a qualification affect consumer interaction. For example, a qualification procedure for store credit approval at an online retailer may be developed to enable lenders to more optimally introduce soft credit approval within the consumer shopping experience and a variant qualification may be developed embodying the CTA in a different method or requiring different consumer financial information to approve credit. Both the baseline qualification and the variant qualification can then be deployed and consumer engagement data with both the baseline and variant can be monitored and analyzed to determine which of the baseline or the variant led to better outcomes for the consumer and lender participating in qualification. In some embodiments, test plans may be received, retrieved, or otherwise obtained from qualification database 1910 by dynamic qualification engine 1720 as an input into suggesting element alterations.

According to some embodiments, the analytic module 1722 may receive, retrieve, or otherwise obtain a plurality of data such as, but not limited to, details of interactions with CTAs, interaction data, offer data, offer action data, time to act on a particular offer, and qualification data, and may process the plurality of data in order to determine the efficacy of a given qualification and/or qualification procedure. In some embodiments, analytic module 1722 may received data pertaining to at least two qualifications comprising a baseline qualification and a variant qualification, and determine which of the two qualifications produced better results based upon analysis of the received data.

Figure 18:
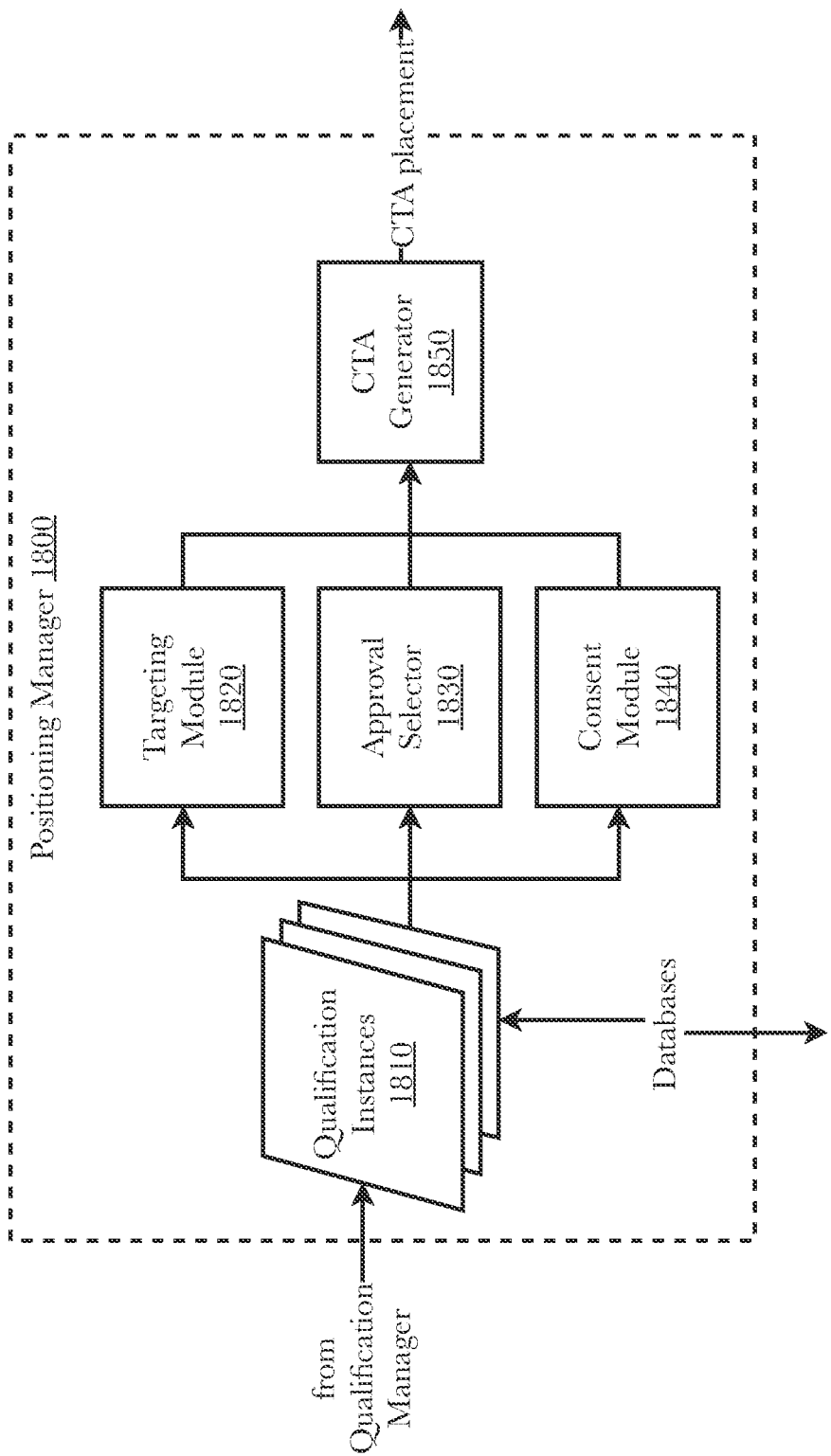
FIG. 18 is an exemplary positioning manager aspect of a soft credit approval system using text redirect.

FIG. 18 is an exemplary positioning manager aspect of a soft credit approval system using text redirect. In this embodiment, the positioning manager 1800 creates qualification instances from a lender's qualifications, and automatically determines where and when to place CTAs for each qualification instance depending on targeting, approval, and payment goals.

The positioning manager 1800 receives notification of a qualification scheme or procedure from the qualification manager, retrieves relevant information about the qualification from the databases 1900, and creates one or more qualification instances 1810 for implementation of the qualification. Not all qualifications will have multiple instances. Depending on the qualification configuration, each qualification instance will represent some portion or division of the qualification for implementation. For example, in a qualification scheme for a brick and mortar location, instances may be generated for different physical areas or based on interactable objects within the location which may be assigned different qualification requirements or offer options, such as homeowner status and home address for pulling estimated mortgage payments versus rental liability and payment history or offer amounts calculated based on the retail price of the object. Qualification instances 1810 will typically have rules associated with targeting, approval, and payments. In this embodiment, each instance is analyzed by a targeting module 1810 to identify targeting rules and constraints and output a qualification target range, an approval selector 1830 to identify approval requirements and output a required approval selection range, and a consent module 1840 to identify communication requests for the instance and output requested communications for obtaining user consent within the instance. The outputs of the targeting module 1820, approval selector 1830, and consent module 1840 are sent to a CTA generator 1850 which generates an appropriate CTA to a user mobile device in accordance with the lender's qualification parameters.

Figure 19:
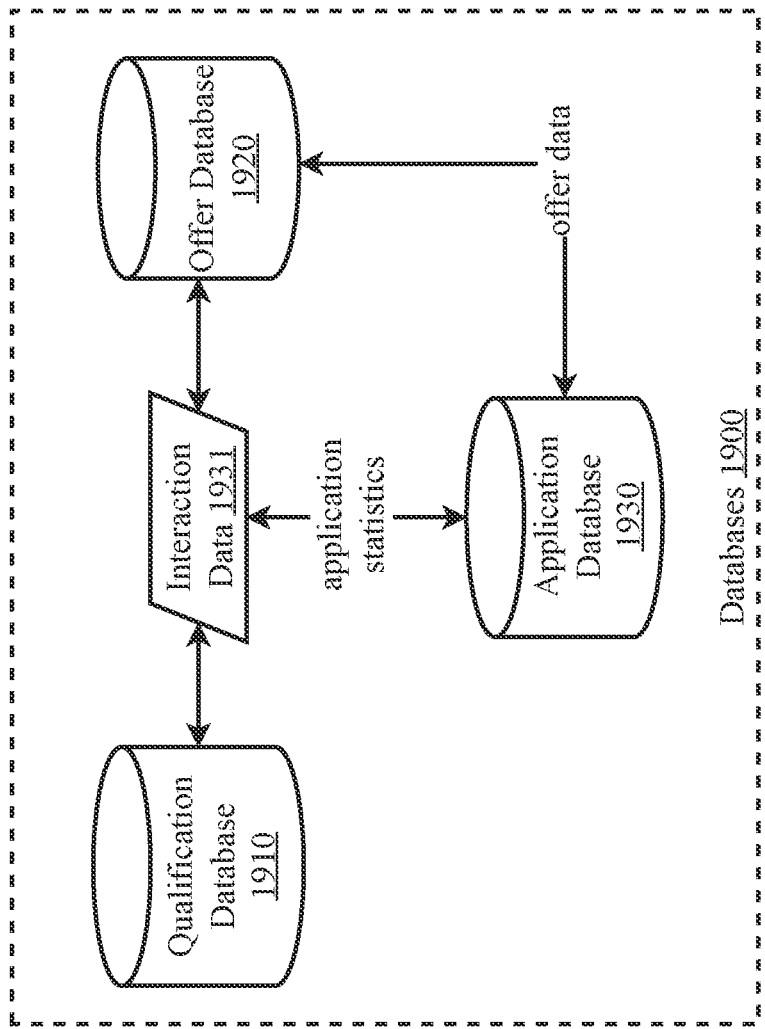
FIG. 19 is an exemplary set of databases for a soft credit approval system using text redirect.

FIG. 19 is an exemplary set of databases for a soft credit approval system using text redirect. The databases 1900 store qualification information, offer information, and application information.

The qualification database 1910 comprises information about the lender for facilitating qualifications between lenders and consumers such as consumer identification requirements; instructions for qualifying a consumer's creditworthiness; maps of qualification systems including interaction points and associated instance information; and additional qualification information such as time limitations and financial requirements. The qualification database 1910 may be configured to store a plurality of qualification instructions including the associated qualification instructions for each qualification instance, which may further include lending criteria and an approval procedure for identifying whether a consumer may be approved for lending. In some embodiments, the qualification instructions specify a plurality of qualification criteria that may be accepted to approve a consumer.

The qualification database 1910 may take the form of a managed or unmanaged database, document-oriented database system, or SQL database, or other suitable form of database. Examples of types of database software that may operate include MYSQL™, ORACLE DATABASE™, MONGODB™, and others. The qualification database 1910 may exist as a distinct physical device or be operating on another computing device that may perform other functions aside from operating, hosting and serving the qualification database 1910. If the qualification database 1910 is a distinct physical device, the database may be connected over a LAN or WAN, the Internet, a direct physical connection to another device, or some other network connection. The qualification database 1910 may be a centralized database system. The qualification database 1910 may be a distributed database system.

The offer database 1920 comprises information about credit offers for facilitating credit offerings and communication between lenders and consumers. This information may be stored as pre-generated credit offerings and minimum qualification requirements to communicate a credit offering to a consumer, or as a range of lending criteria and offer components with a lending matrix for generating individualized offerings based on provided or accessible consumer information.

The application database 1930 comprises information about credit applications for facilitating application completion and submission from consumers to lenders, such as application questions or additional consumer information requirements.

Interaction data 1931 may be generated from any interactions between lenders and consumers, and may be stored in any of the three databases 1910-1930, as necessary.

Figure 20:
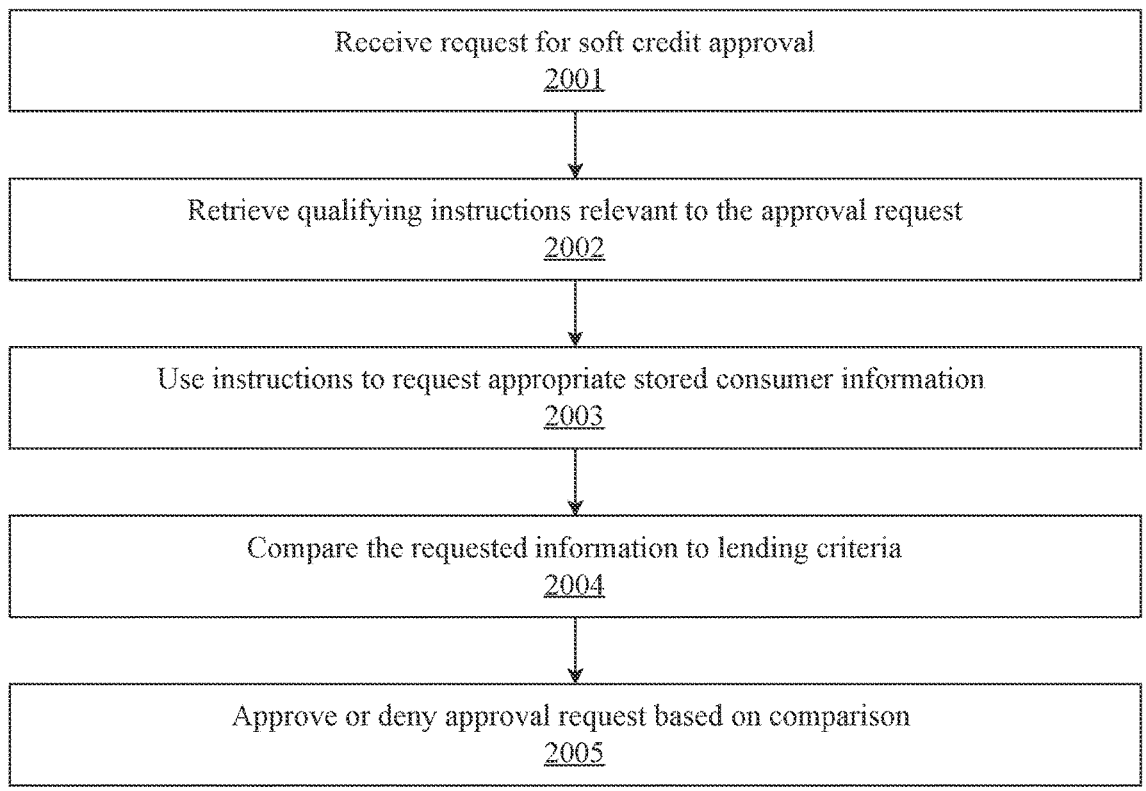
FIG. 20 is a flow diagram illustrating an exemplary method for analyzing consumer creditworthiness for soft credit approval.

FIG. 20 is a flow diagram illustrating an exemplary method 2000 for analyzing consumer creditworthiness for soft credit approval. The communication request is initialized by providing a consumer with a mobile device some means by which they may initiate a communication related to some product or service the person is interested in. Such means may comprise a billboard with a phone number or a URL, or an advertisement in a retail store or magazine with a QR code, or may comprise an online advertisement that is selected or clicked by the consumer, among many other options and combinations. When the user interacts with the advertisement (e.g., goes to the URL, clicks on the advertisement, scans a QR code, etc.) a text message is autopopulated on the consumer's device. The means to produce both the content of the text message and the text message itself may happen in various ways. The content of the text message may be retrieved from the URL, or may be embedded within the QR code, or originate from the advertisement that was selected. As with the exemplary means in the previous statement, each means may also have a way to embed other contextual information for the purposes of qualification satisfaction. This "other context" may include the time the interaction was initiated, geographic location, identifying information about the mobile device or consumer, advertisement matching information, and other data and metadata useful for such interactions. Once the text message and all of its content is populated on the consumer's device the consumer may simply tap the send button. The text message is then received by a service that facilitates a privacy compliant communication relevant to the advertisement/product/service. One example is when a consumer selects an online advertisement to be prequalified for soft credit approval to use in purchasing a specific car, information from the consumer's device and information contained by or retrieved by the CTA associated with the advertisement is used to auto populate the text message. The text message acts as a request for soft credit approval, which, when received 2001, activates the retrieval of qualifying instructions 2002 related to the purchase of the specific car. The qualifying instructions are then used to request the appropriate stored consumer information 2003, which may include consumer identification information or consumer financial information. Once received, the requested consumer information is compared to lending criteria 2004 contained within the instructions for how to qualify the consumer for soft credit approval. The soft credit approval request is approved or denied based on the results of the comparison 2005.

Figure 21:
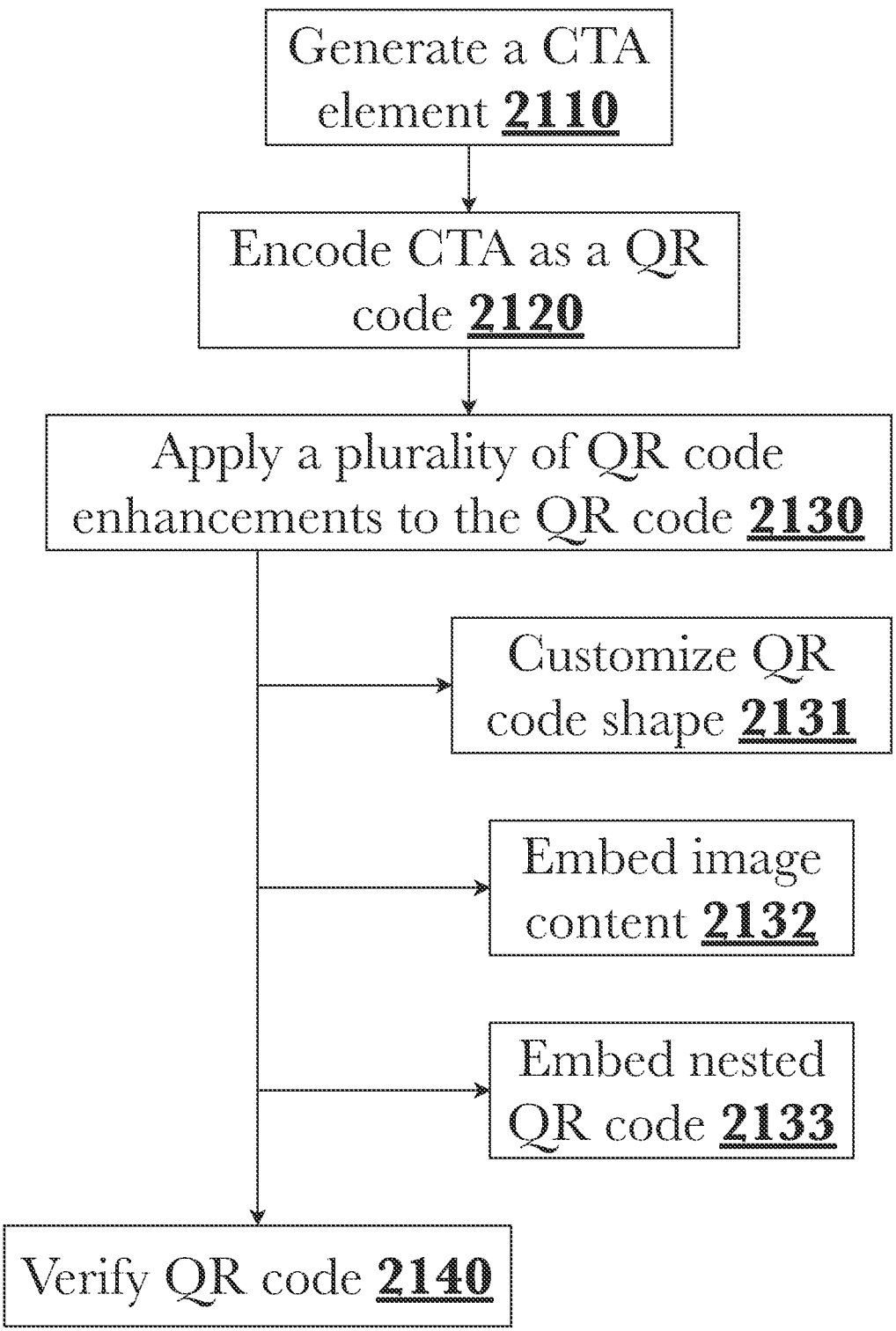
FIG. 21 is a flow diagram illustrating an exemplary method for generating and verifying a call-to-action as an enhanced QR code.

FIG. 21 is a flow diagram illustrating an exemplary method for generating and verifying a call-to-action as an enhanced QR code. Initially 2110, a CTA 1530 may be generated that comprises instructions or information such as (for example, including but not limited to) a uniform resource indicator (URI) that may be processed by a web browser or other software application. Generally, a URI is used to retrieve a webpage or formatted content that may trigger actions on a device, such as opening a text messaging application and pre-populating information within a message for a user to review and send. URIs may also comprise query fields that may be populated with information based on, for example, device hardware or software information such as a browser identifier, network connection, screen size, or other information that may be known by the device parsing the URI. The CTA instructions or content (such as a URI with query fields to provide device-specific information when scanned), may be encoded as a QR code 2120 by processing the text content of the CTA and translating it according to published QR code standards. For example, a standards-compliant QR code requires the use of a plurality of location indicators that a device camera uses to recognize the QR code from other image content within view, as well as a number of optional elements such as alignment indicators for larger QR codes to ensure accurate scanning (for example, when scanning a printed QR code from a page that may not be perfectly flat and perpendicular to a scanner lens). This produces a standard QR code comprising a two-dimensional (2D) array of visual elements that translates to the text content when scanned. To provide enhanced functionality, additional elements may then be incorporated 2130 into the QR code beyond what is required by a published standards specification, such as (for example, including but not limited to) the use of customized code shapes 2131, additional image content 2132, or the use of secondary embedded QR codes 2133 that may be placed within the enhanced QR code. Each of these enhancements may be used to provide additional data beyond what is possible with standard 2D encoding, and multiple elements may be combined as desired to achieve a particular CTA result. Finally, a software-based QR code interpreter may be used to translate the resulting enhanced QR code to ensure proper function 2140, such as verifying that any desired data fields are populated in a URI, the formatting and content are correct, and parsing the URI produces the expected CTA response.

Any number of QR codes and various instructions they comprise may be generated and optionally stored for future use or revision, and it thus is possible to maintain control over an already-published QR code through control of the database containing the CTA responses triggered by scanning the QR code. For example, a QR code comprising a URI that fetches web content (for example, such as a tailored web page designed to open a messaging application on a smartphone or other mobile device) may be modified by altering the web content that is served, without the need to change the encoded QR code content and publish a new code. By operating in a request-response arrangement, any number of QR codes may be published without need to update or modify their content in the future, and any changes may be performed at the database instead. This also provides functionality for disabling QR codes, or providing controlled access; for example, a QR code may comprise a URI that automatically submits certain device or user information with the request (for example, a device browser or operating system version). This user or device-specific information may be used when processing the URI and selecting web content to provide, such as to provide content that is compatible with a particular web browser application or operating system, or to provide specific content to certain devices or users while providing different content to others. This may be further expanded with any of a variety of advanced automation rules, such as scheduling rules that cause the behavior of a QR code to change based on date or time of day (for example, a QR code could provide special holiday content on certain days, or promotional content for a limited time), or rules that change the behavior of a QR code based not only on consumer or device information but on available third-party information that may be retrieved in response to a scan, click, or other interaction with the code.

Figure 22:
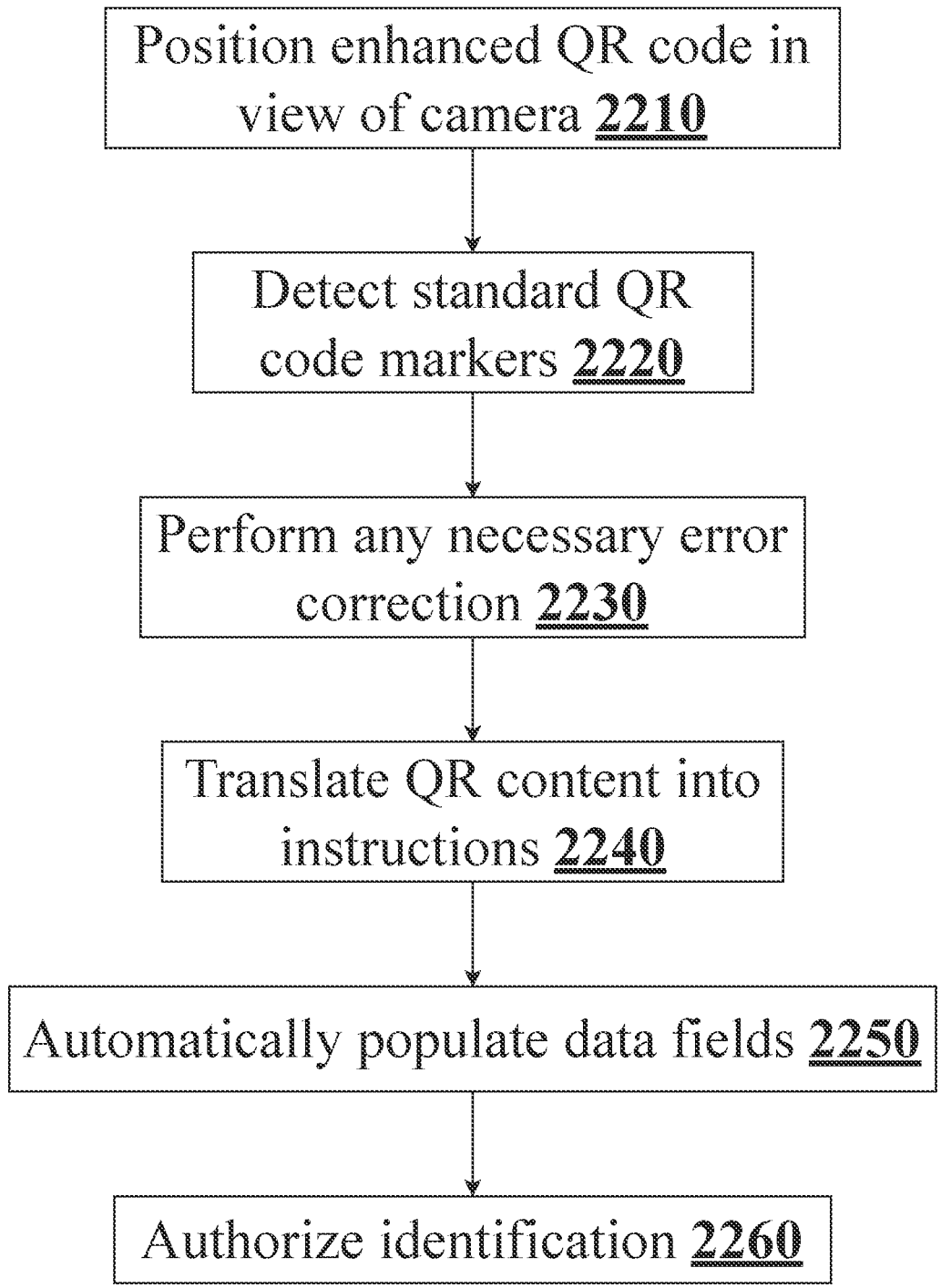
FIG. 22 is a flow diagram illustrating an exemplary method for scanning an enhanced QR code embodying a call-to-action.

FIG. 22 is a flow diagram illustrating an exemplary method 2200 for scanning an enhanced QR code embodying a call-to-action. When a consumer positions an enhanced QR code 2210 in view of their device camera, for example with a camera-enabled mobile device such as (for example, including but not limited to) a smartphone or tablet computing device, the camera software may recognize the QR code format from a plurality of standards-compliant elements 2220 such as location or alignment markers, as are specified in published standards specifications for QR codes. If the enhanced QR code utilizes a customized shape (that is, the encoded data takes a shape other than the standard square), the data may be read and processed normally using the embedded location and/or alignment markers; QR code standards specify certain measures in both the encoding and the reading of a code to account for damaged or obscured codes. If portions of the code are indeed damaged or obscured, such as a code printed on a wrinkled page or on a worn sign, the device may error-correct 2230 using embedded Reed-Solomon error correction codes that are specified as part of the QR code standards, ensuring the code is translated back into the correct text content without error. The content of the QR code may then be parsed 2240, for example opening an encoded URI in a web browser application on the device or executing instructions to perform any of a variety of actions. Information fields within an action or URI (for example, text fields in a message or email being generated, or query fields in a URI being parsed) that the device or browser may fill in automatically 2250, such as (for example) populating device hardware or software information, a timestamp, or data fields that may be populated using data in memory from any enhanced QR code elements that were scanned. For example, a URI field may be populated with information about an identified embedded image within an enhanced QR code, such as the name of a recognized individual. As another example, a URI may open a messaging application on the user's device and pre-populate information for sending a text message with specific content, such as (for example) a destination phone number or address, specific text fields such as a message title or body, or any other data that may be encoded within the QR code or retrieved in response to prompts or fields that are encoded. The consumer may then choose to authorize a soft credit approval request 2260, such as submitting a populated URI or sending a pre-populated text message, placing a phone call to a pre-populated number, or any other action that may be triggered on the mobile phone based on the content encoded within the scanned enhanced QR code.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 23:
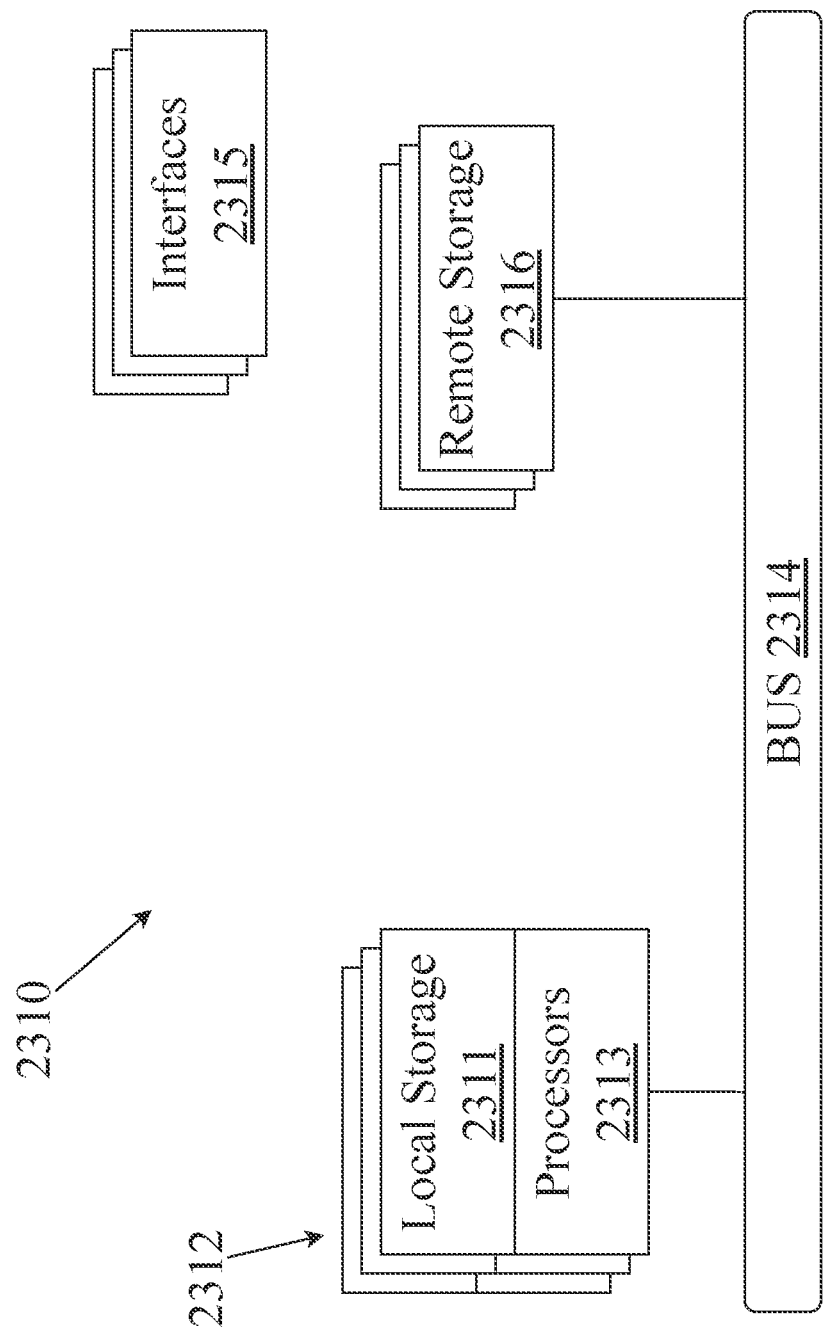
FIG. 23 is a block diagram illustrating an exemplary hardware architecture of a computing device.

Referring now to FIG. 23, there is shown a block diagram depicting an exemplary computing device 2310 suitable for implementing at least a portion of the features or functionalities disclosed herein. Computing device 2310 may be, for example, any one of the computing machines listed in the previous paragraph, or indeed any other electronic device capable of executing software- or hardware-based instructions according to one or more programs stored in memory. Computing device 2310 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 2310 includes one or more central processing units (CPU) 2312, one or more interfaces 2315, and one or more busses 2314 (such as a peripheral component interconnect (PCI) bus). When acting under the control of appropriate software or firmware, CPU 2312 may be responsible for implementing specific functions associated with the functions of a specifically configured computing device or machine. For example, in at least one embodiment, a computing device 2310 may be configured or designed to function as a server system utilizing CPU 2312, local memory 2311 and/or remote memory 2316, and interface(s) 2315. In at least one embodiment, CPU 2312 may be caused to perform one or more of the different types of functions and/or operations under the control of software modules or components, which for example, may include an operating system and any appropriate applications software, drivers, and the like.

CPU 2312 may include one or more processors 2313 such as, for example, a processor from one of the Intel, ARM, Qualcomm, and AMD families of microprocessors. In some embodiments, processors 2313 may include specially designed hardware such as application-specific integrated circuits (ASICs), electrically erasable programmable read-only memories (EEPROMs), field-programmable gate arrays (FPGAs), and so forth, for controlling operations of computing device 2310. In a specific embodiment, a local memory 2311 (such as non-volatile random access memory (RAM) and/or read-only memory (ROM), including for example one or more levels of cached memory) may also form part of CPU 2312. However, there are many different ways in which memory may be coupled to system 2310. Memory 2311 may be used for a variety of purposes such as, for example, caching and/or storing data, programming instructions, and the like. It should be further appreciated that CPU 2312 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 2315 are provided as network interface cards (NICs). Generally, NICs control the sending and receiving of data packets over a computer network; other types of interfaces 2315 may for example support other peripherals used with computing device 2310. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 2315 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 23 illustrates one specific architecture for a computing device 2310 for implementing one or more of the embodiments described herein, it is by no means the only device architecture on which at least a portion of the features and techniques described herein may be implemented. For example, architectures having one or any number of processors 2313 may be used, and such processors 2313 may be present in a single device or distributed among any number of devices. In one embodiment, a single processor 2313 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 2316 and local memory 2311) configured to store data, program instructions for the general-purpose network operations, or other information relating to the functionality of the embodiments described herein (or any combinations of the above). Program instructions may control execution of or comprise an operating system and/or one or more applications, for example. Memory 2316 or memories 2311, 2316 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably.

Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 24:
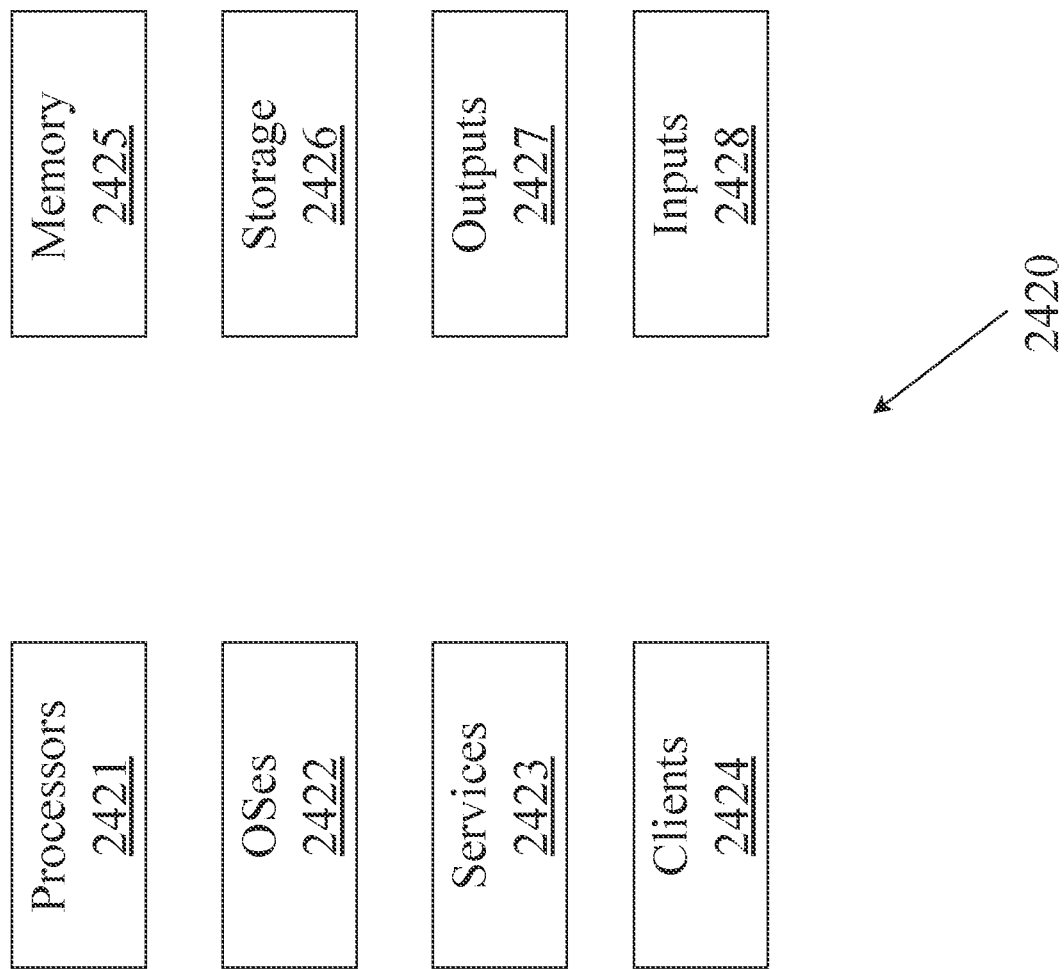
FIG. 24 is a block diagram illustrating an exemplary logical architecture for a client device.

In some embodiments, systems may be implemented on a standalone computing system. Referring now to FIG. 24, there is shown a block diagram depicting a typical exemplary architecture of one or more embodiments or components thereof on a standalone computing system. Computing device 2420 includes processors 2421 that may run software that carry out one or more functions or applications of embodiments, such as for example a client application 2424. Processors 2421 may carry out computing instructions under control of an operating system 2422 such as, for example, a version of MICROSOFT WINDOWS™ operating system, APPLE OSX™ or iOS™ operating systems, some variety of the Linux operating system, ANDROID™ operating system, or the like. In many cases, one or more shared services 2423 may be operable in system 2420, and may be useful for providing common services to client applications 2424. Services 2423 may for example be WINDOWS™ services, user-space common services in a Linux environment, or any other type of common service architecture used with operating system 2421. Input devices 2428 may be of any type suitable for receiving user input, including for example a keyboard, touchscreen, microphone (for example, for voice input), mouse, touchpad, trackball, or any combination thereof. Output devices 2427 may be of any type suitable for providing output to one or more users, whether remote or local to system 2420, and may include for example one or more screens for visual output, speakers, printers, or any combination thereof. Memory 2425 may be random-access memory having any structure and architecture known in the art, for use by processors 2421, for example to run software. Storage devices 2426 may be any magnetic, optical, mechanical, memristor, or electrical storage device for storage of data in digital form (such as those described above, referring to FIG. 23). Examples of storage devices 2426 include flash memory, magnetic hard drive, CD-ROM, and/or the like.

Figure 25:
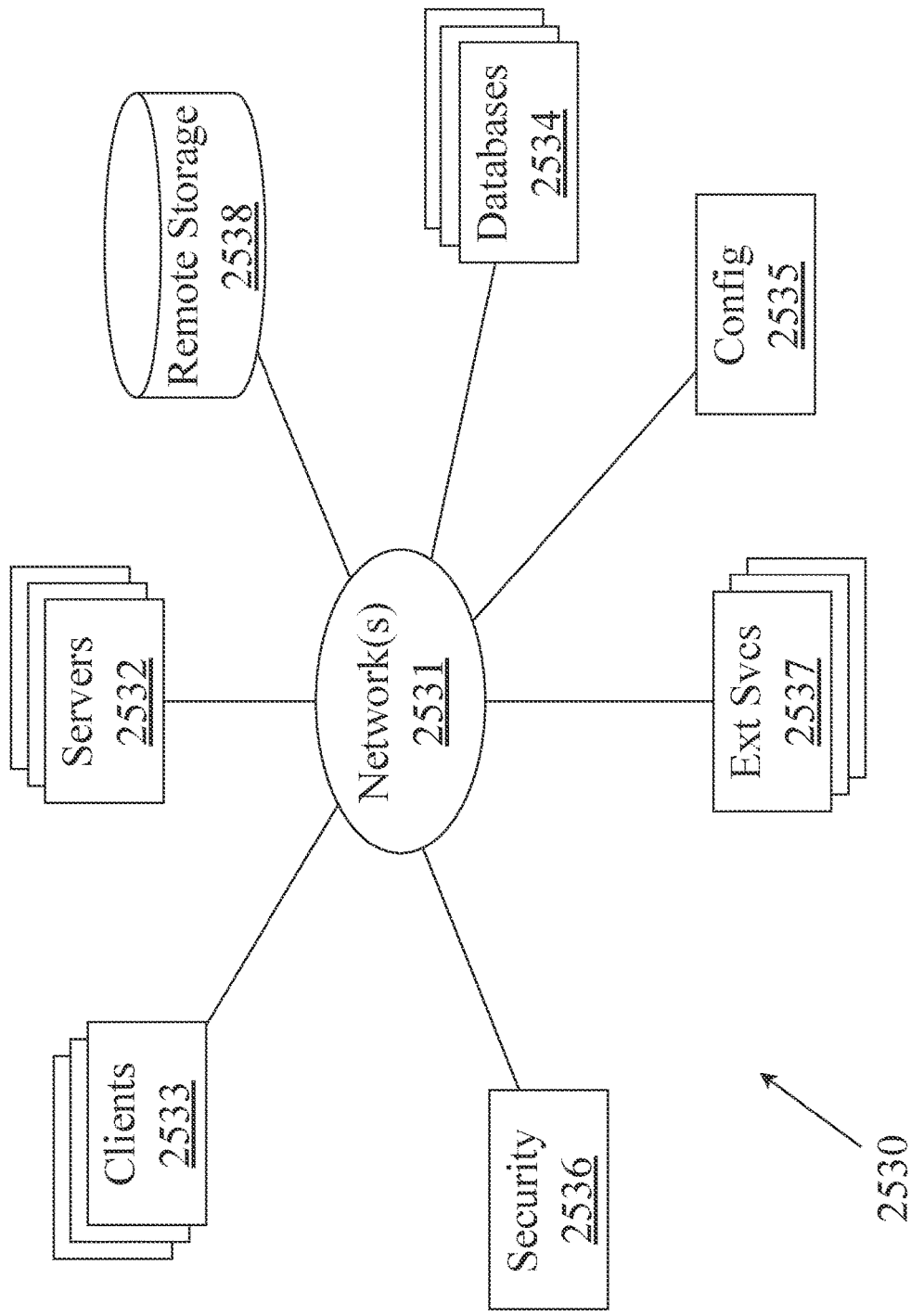
FIG. 25 is a block diagram showing an exemplary architectural arrangement of clients, servers, and external services.

In some embodiments, systems may be implemented on a distributed computing network, such as one having any number of clients and/or servers. Referring now to FIG. 25, there is shown a block diagram depicting an exemplary architecture 2530 for implementing at least a portion of a system on a distributed computing network. According to the embodiment, any number of clients 2533 may be provided. Each client 2533 may run software for implementing client-side portions; clients may comprise a system 2520 such as that illustrated in FIG. 24. In addition, any number of servers 2532 may be provided for handling requests received from one or more clients 2533. Clients 2533 and servers 2532 may communicate with one another via one or more electronic networks 2531, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art. Networks 2531 may be implemented using any known network protocols, including for example wired and/or wireless protocols.

In addition, in some embodiments, servers 2532 may call external services 2537 when needed to obtain additional information, or to refer to additional data concerning a particular call. Communications with external services 2537 may take place, for example, via one or more networks 2531. In various embodiments, external services 2537 may comprise web-enabled services or functionality related to or installed on the hardware device itself. For example, in an embodiment where client applications 2524 are implemented on a smartphone or other electronic device, client applications 2524 may obtain information stored in a server system 2532 in the cloud or on an external service 2537 deployed on one or more of a particular enterprise's or user's premises.

In some embodiments, clients 2533 or servers 2532 (or both) may make use of one or more specialized services or appliances that may be deployed locally or remotely across one or more networks 2531. For example, one or more databases 2534 may be used or referred to by one or more embodiments. It should be understood by one having ordinary skill in the art that databases 2534 may be arranged in a wide variety of architectures and using a wide variety of data access and manipulation means. For example, in various embodiments one or more databases 2534 may comprise a relational database system using a SQL, while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 2536 and configuration systems 2535. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 2536 or configuration system 2535 or approach is specifically required by the description of any specific embodiment.

Figure 26:
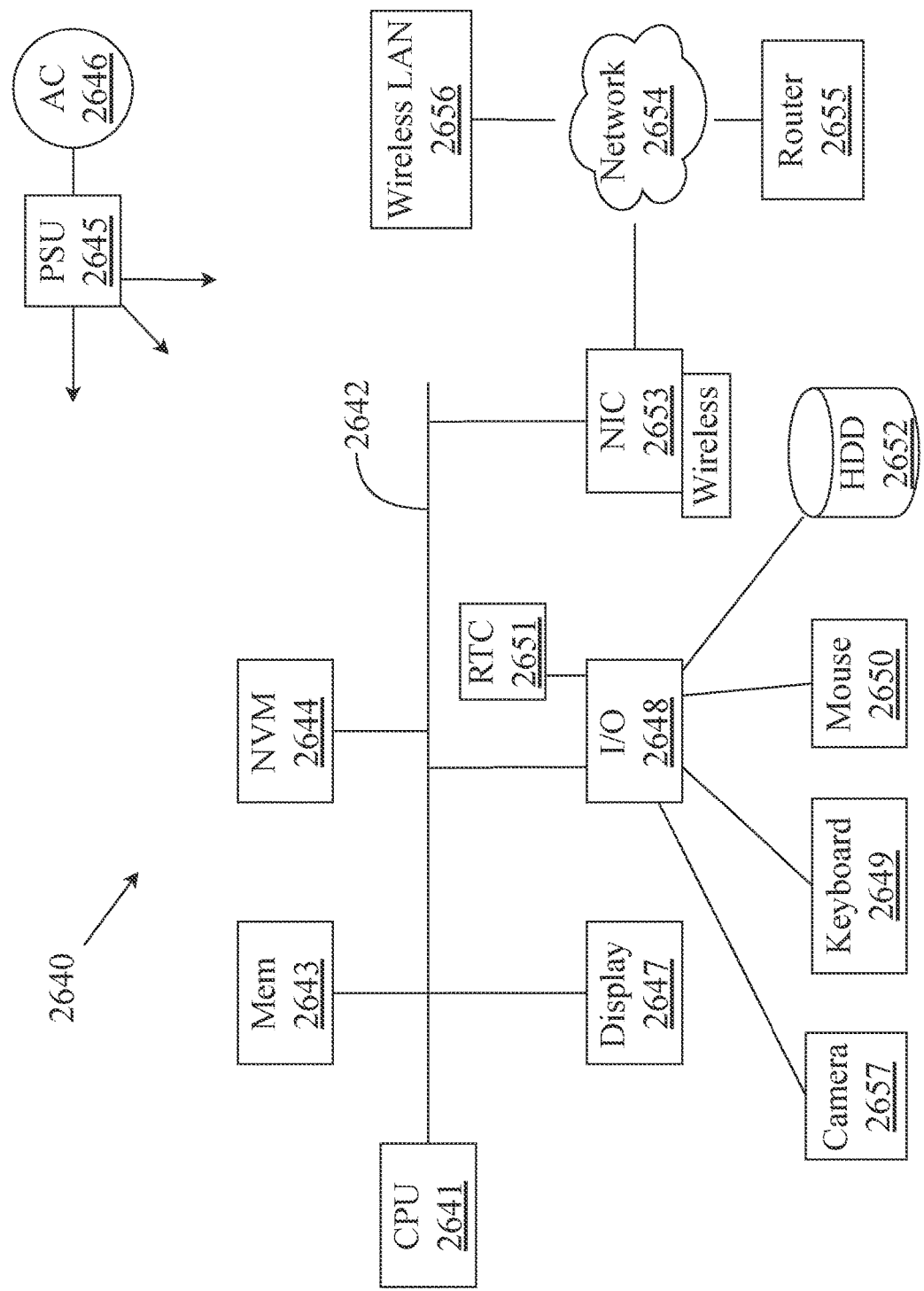
FIG. 26 is another block diagram illustrating an exemplary hardware architecture of a computing device.

FIG. 26 shows an exemplary overview of a computer system 2640 as may be used in any of the various locations throughout the system. It is exemplary of any computer that may execute code to process data. Various modifications and changes may be made to computer system 2640 without departing from the broader scope of the system and method disclosed herein. Central processor unit (CPU) 2641 is connected to bus 2642, to which bus is also connected memory 2643, nonvolatile memory 2644, display 2647, input/output (I/O) unit 2648, and network interface card (NIC) 2653. I/O unit 2648 may, typically, be connected to keyboard 2649, pointing device 2650, hard disk 2652, and real-time clock 2651. MC 2653 connects to network 2654, which may be the Internet or a local network, which local network may or may not have connections to the Internet. Also shown as part of system 2640 is power supply unit 2645 connected, in this example, to a main alternating current (AC) supply 2646. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods may be distributed among any number of client and/or server components. For example, various software modules may be implemented for performing various functions in connection with the various embodiments, and such modules may be variously implemented to run on server and/or client components, in the cloud, across distributed systems, or in any other implementation known to a person with ordinary skill in the art.

The skilled person will be aware of a range of possible modifications of the various embodiments described above. Accordingly, the present invention is defined by the claims and their equivalents for soft credit approval using text redirect.

What is claimed is:

1. A system for soft credit approval using text redirect, comprising:
   one or more computing devices comprising a memory, a processor, and a non-volatile data storage device;
   a first database stored on the non-volatile data storage device, comprising a plurality of lender instructions, each lender instruction of the plurality of lender instructions comprising a scheme for generating placement of call-to-action elements and an approval procedure for qualifying a consumer for receiving credit;
   a positioning manager comprising a first plurality of programming instructions stored in the memory which, when operating on the processor, causes the one or more computing devices to:
   retrieve a lender instruction from the first database;
   generate a call-to-action element comprising coding instructions configured to generate a pre-filled short message service (SMS) or multi-media message service (MMS) message comprising a destination, an identifier, and consumer financial information, such that interaction with the call-to-action element on the user computing device causes the user computing device to propagate the pre-filled SMS or MMS message;
   place the call-to-action element according to the scheme specified in the lender instruction; and
   save the identifier to the lender instruction in the database; and a consumer credit manager comprising a second plurality of programming instructions stored in the memory which, when operating on the processor, causes the one or more computing devices to:
- receive the SMS or MMS message from the user computing device via the destination;
- retrieve from the first database a lender instruction using the identifier;
- analyze, using the consumer financial information and the approval procedure, the consumer's qualification for receiving credit;
- send a notification to the lender; and
- send a second notification to the consumer.

2. The system of claim 1, wherein the system further comprises a second database stored on the non-volatile data storage device, comprising a plurality of offer instructions, each offer instruction of the plurality of offer instructions comprising a plurality of lending criteria and pre-generated credit offers, and the consumer credit manager is further configured to:
- retrieve from the second database an offer instruction corresponding to the lender instruction from the first database;
- select, using the consumer's analyzed credit qualification, a pre-qualified credit offer from the plurality of credit offers;
- generate, using the consumer's analyzed credit qualification and the lending criteria, an individualized pre-qualified credit offer; and
- send a selected or generated credit offer to the consumer.

3. The system of claim 1, wherein the system further comprises a third database stored on the non-volatile data storage device, comprising a plurality of credit application instructions, each credit application instruction of the plurality of credit application instructions comprising a plurality of application questions, and wherein the consumer credit manager is further configured to:
- receive a consumer's action on a credit offer authorizing a credit application;
- retrieve from the third database a credit application instruction corresponding to the lender associated with the consumer actioned credit offer;
- complete, following the credit application instruction, the credit application;
- send the completed credit application to the consumer for approval or correction;
- receive one or more corrections from the consumer;
- update the completed credit application using the one or more corrections; and
- send the correct, completed credit application to the lender.

4. The system of claim 1, wherein the consumer financial information comprises a soft credit pull.

5. The system of claim 1, wherein the consumer financial information comprises a verified bank account balance.

6. The system of claim 1, wherein the consumer financial information comprises direct deposit information.

7. The system of claim 1, wherein the call-to-action element comprises an interactable button or link, an NFC beacon, or a scannable QR code.

8. The system of claim 1, wherein the SMS or MMS message further comprises user consent to receive communications from the lender.

9. The system of claim 2, wherein the consumer is sent multiple credit offers to choose from, wherein each of the multiple credit offers features differences in at least credit amount, credit rate, or credit term.

10. The system of claim 3, wherein the credit application is automatically completed using consumer information retrieved from the consumer's universal identity profile.

11. A method for soft credit approval using text redirect, comprising the steps of:
- creating a first database on a non-volatile data storage device of one or more computing devices, the one or more computing devices comprising a memory, a processor, and the non-volatile data storage device, the database comprising a plurality of lender instructions, each lender instruction of the plurality of lender instructions comprising a scheme for generating placement of call-to-action elements and an approval procedure for qualifying a consumer for receiving credit;
- using a positioning manager operating on the one or more computing devices to perform the steps of:
  - retrieving a lender instruction from the first database;
  - generating a call-to-action element comprising coding instructions configured to generate a pre-filled short message service (SMS) or multi-media message service (MMS) message comprising a destination, an identifier, and consumer financial information, such that interaction with the call-to-action element on the user computing device causes the user computing device to propagate the pre-filled SMS or MMS message;
  - placing the call-to-action element according to the scheme specified in the lender instruction;
  - saving the identifier to the lender instruction in the database;
- using a consumer credit manager operating on the one or more computing devices to perform the steps of:
  - receiving the SMS or MMS message from the user computing device via the destination;
  - retrieving from the first database a lender instruction using the identifier;
  - analyzing, using the consumer financial information and the approval procedure, the consumer's qualification for receiving credit;
  - sending a notification to the lender; and
  - sending a second notification to the consumer.

12. The method of claim 11, wherein the method further comprises the step of creating a second database stored on the non-volatile data storage device, the second database comprising a plurality of offer instructions, each offer instruction of the plurality of offer instructions comprising a plurality of lending criteria and pre-generated credit offers, and the consumer credit manager is further configured to perform the steps of:
- retrieving from the second database an offer instruction corresponding to the lender instruction from the first database;
- selecting, using the consumer's analyzed credit qualification, a pre-qualified credit offer from the plurality of credit offers;
- generating, using the consumer's analyzed credit qualification and the lending criteria, an individualized pre-qualified credit offer; and
- sending a selected or generated credit offer to the consumer.

13. The method of claim 11, wherein the method further comprises the step of creating a third database stored on the non-volatile data storage device, the third database comprising a plurality of credit application instructions, each credit application instruction of the plurality of credit application instructions comprising a plurality of application questions, and wherein the consumer credit manager is further configured to perform the steps of:
- receiving a consumer's action on a credit offer authorizing a credit application;
- retrieving from the third database a credit application instruction corresponding to the lender associated with the consumer actioned credit offer;
- completing, following the credit application instruction, the credit application;
- sending the completed credit application to the consumer for approval or correction;
- receiving one or more corrections from the consumer;
- updating the completed credit application using the one or more corrections; and
- sending the correct, completed credit application to the lender.

14. The method of claim 11, wherein the consumer financial information comprises a soft credit pull.

15. The method of claim 11, wherein the consumer financial information comprises a verified bank account balance.

16. The method of claim 11, wherein the consumer financial information comprises direct deposit information.

17. The method of claim 11, wherein the call-to-action element comprises an interactable button or link, an NFC beacon, or a scannable QR code.

18. The method of claim 11, wherein the SMS or MMS message further comprises user consent to receive communications from the lender.

19. The method of claim 12, wherein the consumer is sent multiple credit offers to choose from, wherein each of the multiple credit offers features differences in at least credit amount, credit rate, or credit term.

20. The system of claim 13, wherein the credit application is automatically completed using consumer information retrieved from the consumer's universal identity profile.

* * * * *